United States Patent
Luhring et al.

(10) Patent No.: US 11,250,181 B2
(45) Date of Patent: Feb. 15, 2022

(54) FUNCTIONAL RELATIONSHIP MANAGEMENT IN PRODUCT DEVELOPMENT

(71) Applicant: Enventive Engineering, Inc., South Lancaster, MA (US)

(72) Inventors: Don Luhring, South Lancaster, MA (US); Ralph Gifford, South Lancaster, MA (US); Vincent Huffaker, South Lancaster, MA (US)

(73) Assignee: ENVENTIVE ENGINEERING, INC., South Lancaster, MA (US)

( * ) Notice: Subject to any disclaimer, the term of this patent is extended or adjusted under 35 U.S.C. 154(b) by 638 days.

(21) Appl. No.: 16/147,315

(22) Filed: Sep. 28, 2018

(65) Prior Publication Data

US 2019/0102508 A1    Apr. 4, 2019

Related U.S. Application Data

(60) Provisional application No. 62/565,308, filed on Sep. 29, 2017.

(51) Int. Cl.
*G06F 30/17* (2020.01)
*G06F 17/18* (2006.01)
(Continued)

(52) U.S. Cl.
CPC ............. *G06F 30/17* (2020.01); *G06F 17/18* (2013.01); *G06F 30/20* (2020.01);
(Continued)

(58) Field of Classification Search
CPC .......... G06F 30/17; G06F 30/18; G06F 30/20; G06F 2111/20; G06F 2111/08; G06F 2119/18
See application file for complete search history.

(56) References Cited

U.S. PATENT DOCUMENTS 5,617,510 A    4/1997   Keyrouz et al.
5,831,875 A    11/1998  Hirata et al.
(Continued)

OTHER PUBLICATIONS

Bo et al. "A comparison of tolerance analysis modes for assembly". DOI 10.1007/s00170-013-4795-2. Int J Adv Manuf Technol (2013) 68:739-754. (Year: 2013).*

(Continued)

*Primary Examiner* — Eunhee Kim
(74) *Attorney, Agent, or Firm* — Hamilton, Brook, Smith & Reynolds, P.C.

(57) ABSTRACT

A functional relationship management (FRM) system manages design, implementation and manufacture of products. The FRM system may organize and manages diverse sets of design inputs from diverse sources, computing functional conditions for each set of design inputs. Published design inputs and resulting functional conditions can be shared among several users. Each user may implement a distinct set of working design inputs, and the system can provide the resulting set of working functional conditions. When used with a variational modeling system, the FRM system can be automatically populated to identify all design inputs that affect a functional condition in a given variational model. The system also supports the ability for users to manually add models, design inputs, functional conditions, and functional relationships between the design inputs and functional conditions. The system further supports the addition of FMEA data such as failure modes. When using manufacturing data as a source of design inputs, the system can compute the as-manufactured probability of failure, and determine the as-manufactured probability of triggering failure modes.

26 Claims, 19 Drawing Sheets

(51) Int. Cl.
   *G06F 30/20*     (2020.01)
   *G06F 111/08*    (2020.01)
   *G06F 111/20*    (2020.01)
   *G06F 119/18*    (2020.01)

(52) U.S. Cl.
   CPC ....... *G06F 2111/08* (2020.01); *G06F 2111/20* (2020.01); *G06F 2119/18* (2020.01)

(56) References Cited

U.S. PATENT DOCUMENTS

| | | | |
|---|---|---|---|
| 5,867,397 | A | 2/1999 | Koza et al. |
| 6,333,749 | B1 | 12/2001 | Reinhardt et al. |
| 6,377,263 | B1 | 4/2002 | Falacara et al. |
| 6,433,776 | B1 | 8/2002 | Todd |
| 6,889,113 | B2 | 5/2005 | Tasker et al. |
| 6,947,037 | B1 | 9/2005 | Lynn et al. |
| 6,963,824 | B1 | 11/2005 | Davidson et al. |
| 7,233,341 | B1 | 6/2007 | Sauerbrei |
| 7,623,139 | B1 | 11/2009 | Gifford et al. |
| 7,639,267 | B1 | 12/2009 | Desimone et al. |
| 7,969,435 | B1 | 6/2011 | Desimone et al. |
| 8,793,097 | B2 | 7/2014 | Sheehan |
| 9,384,591 | B2 | 7/2016 | Hurt et al. |
| 2002/0128810 | A1 | 9/2002 | Craig et al. |
| 2002/0143507 | A1* | 10/2002 | Lu ............ G06F 30/13 703/7 |
| 2003/0149498 | A1 | 8/2003 | Rebello et al. |
| 2003/0149502 | A1 | 8/2003 | Rebello et al. |
| 2003/0182311 | A1 | 9/2003 | Nakajima et al. |
| 2003/0187879 | A1 | 10/2003 | Tamaru et al. |
| 2004/0090439 | A1 | 5/2004 | Dillner |
| 2005/0071042 | A1 | 3/2005 | Subrahmanyam et al. |
| 2006/0106476 | A1 | 5/2006 | Tornquist et al. |
| 2010/0298967 | A1 | 11/2010 | Desimone et al. |
| 2012/0069011 | A1* | 3/2012 | Hurt ............ G06T 19/00 345/419 |
| 2018/0181691 | A1* | 6/2018 | Pedersen ............ G06F 30/23 |

OTHER PUBLICATIONS

Shah et al. "Computer Modeling of Geometric Variations in Mechanical Parts and Assemblies". [DOI: 10.1115/1.1572177]. Journal of Computing and Information Science in Engineering. vol. 3, Mar. 2003. pp. 54-63. (Year: 2003).*

Ghali et al. "A CAD method for tolerance allocation considering manufacturing difficulty based on FMECA tool". DOI 10.1007/s00170-016-9961-x. Int J Adv Manuf Technol (2017) 91:2435-2446. (Year: 2017).*

Alvarado, "A Natural Sketching Environment: Bringing the Computer into Early Stages of Mechanical Design", MIT, May 2000, pp. 1-104.

"Focus on Electrical/Mechanical and Computer/Software-related Claims." Examination Guidance and Training Materials, USPTO, Jul. 2015. Web. Aug. 20, 2015. <http://www.uspto.gov/sites/default/files/documents/uspto_112a_part1_1_7_aug20_15.pptx> (31 pages).

Owen, John C. "Algebraic solution for geometry from dimensional constraints." Proceedings of the first ACM symposium on Solid modeling foundations and CAD/CAM applications. ACM, 1991 (11 pages).

Robison, Richard Hooper. A practical method for three-dimensional tolerance analysis using a solid modeler. Diss. Brigham Young University. Department of Mechanical Engineering., 1989 (162 pages).

Jbira et al., "CAD/Tolerancing integration: Mechanical assembly with form defects", Advances in Engineering Software 114(2017) 312-324.

Li et al., "Positioning of Toleranced Parts in a 2-D Polygonal Assembly and its Use in Tolerance Analysis". IEEE Transactions on Robotics and Automation, vol. 17, No. 3, Jun. 2001. pp. 357-360.

Li et al. "Relative positioning of tolerance polyhedral parts in an assembly", Il E transactions, Apr. 1, 2001, vol. 33 (4), p. 323-336.

Schleich et al., "Evaluation of geometric tolerances and generation of variational part representatives for tolerance analysis", Int J Adv Manu Technol (2015) 79:959-983.

* cited by examiner

☐ Contributors Selection

| Drawing Name | Drawing Revision | Model Name | Contributor Name | Nominal | Upper Limit | Lower Limit | Target Cpk | Mean Shift Factor |
|---|---|---|---|---|---|---|---|---|
| 537286 | 01 | Housing | CoincidentPorts278 | 0.00000 | 0.01000 | 0.00000 | 1.00000 | 0.00000 |
| 537286 | 01 | Housing | CoincidentPorts277 | 0.00000 | 0.01000 | 0.00000 | 1.00000 | 0.00000 |
| 537286 | 01 | Housing | PositionConstraint1 | 0.00000 | 0.01000 | 0.00000 | 1.00000 | 0.00000 |
| 537286 | 01 | Housing | Inner_Dia | 0.83000 | 0.00500 | -0.00500 | 1.00000 | 0.00000 |
| 537286 | 01 | Housing | FiringPinOpening | 0.36500 | 0.00500 | -0.00500 | 1.00000 | 0.00000 |
| 537286 | 01 | Housing | PositionConstraint2 | 0.00000 | 0.01000 | 0.00000 | 1.00000 | 0.00000 |
| 537286 | 01 | Housing | Dim2 | 0.11500 | 0.00500 | -0.00500 | 1.00000 | 0.00000 |
| 537286 | 01 | Housing | LDim259 | 0.10000 | 0.00500 | -0.00500 | 1.00000 | 0.00000 |
| 537286 | 01 | Housing | MA_Dim3058 | 0.47500 | 0.00500 | -0.00500 | 1.00000 | 0.00000 |
| 537286 | 01 | Housing | ADim209 | 20.00000 | 0.50000 | -0.50000 | 1.00000 | 0.00000 |
| 537286 | 01 | Housing | ADim225 | 43.00000 | 0.50000 | -0.50000 | 1.00000 | 0.00000 |
| 537286 | 01 | Housing | Dim1 | 0.11800 | 0.00200 | -0.00200 | 1.00000 | 0.00000 |

20 ▼ Items per Page 1-12 of 12 Items

OK    Cancel

FUNCTIONAL RELATIONSHIP MANAGEMENT IN PRODUCT DEVELOPMENT

RELATED APPLICATION

This application claims the benefit of U.S. Provisional Application No. 62/565,308, filed on Sep. 29, 2017. The entire teachings of the above application are incorporated herein by reference.

BACKGROUND

Typical approaches to product development, from design to manufacture, involve the use of computer-aided design (CAD) tools to define the geometry of a product and simulate the performance of a product. The product may include several components that must function in concert with one another. However, during manufacture, some of those components may be nonconforming, failing to match the specifications defined by the design. A disposition is a decision during a manufacturing process that determines how a nonconforming component will be used, or whether it must be discarded. Disposition can include changing specifications of the design to match the as-manufactured condition.

Because time and cost constraints require rapid disposition decisions, manufacturers have relied on historical experience coupled with improvised handwork solutions and luck. Lacking the type of data generated by example embodiments, disposition decisions may be inaccurate or inconsistent. Recalls, warranty repairs, product failures, and excess scrap are the casualties of disposition decisions where the gamble fails to pay off.

SUMMARY

Example embodiments provide a Functional Relationship Management (FRM) system that uses engineering models as function calculators that compute Functional Conditions as function of Design Inputs. The FRM system may organize and manages diverse sets of Design Inputs from diverse sources, computing Functional Conditions for each set of Design Inputs. Published Design Inputs and resulting Functional Conditions are shared by all users. Each user has his/her own set of working Design Inputs, with the resulting set of working Functional Conditions. Sets of Design Inputs may also come from other sources such as CAD models and as-manufactured data. The FRM may store all sets of all Design Inputs and resulting Functional Conditions so that there is a complete history of Design Inputs and Functional Conditions from design through manufacturing.

When used with a modeling system that includes a Dependency Manager, the FRM system may be automatically populated by using the ability of the Dependency Manager to identify all Design Inputs that affect a Functional Condition in a given Engineering Model. The FRM system may also support the ability for users to manually add models, Functional Conditions, Design Inputs, and functional relationships between the Design Inputs and Functional Conditions. The FRM further supports the addition of FMEA data such as functional limits, failure modes, and failure severities. This additional data then supports the computation of risk indices for Functional Conditions and criticality scores for Design Inputs. With the ability to use manufacturing data as a source of Design Input values, the FRM can compute the as-manufactured probability of failure, and determine the as-manufactured probability of triggering failure modes.

An example embodiment includes a computer-implemented method. Functional conditions of a plurality of engineering models are identified, the plurality of engineering models defining interaction of parts of at least one model assembly to simulate the functional conditions. Contributors to the functional conditions are identified, the contributors including geometric properties of the at least one model assembly. A relation between the contributors and the functional conditions is identified. A selection of the engineering models to compute each of the functional conditions as a function of the contributors is identified. Updated functional conditions are determined in response to a change to the contributors. A database may then be configured to indicate 1) a subset of the contributors associated with each of the functional conditions, 2) a subset of the functional conditions associated with each of the contributors, and 3) the selection of the engineering models and contributors required to compute each of the functional conditions.

The plurality of engineering models may define operation of a physics engine for simulating behavior of the plurality of model assemblies. The functional conditions may represent a result of simulated interaction of parts of an assembly as a function of the plurality of engineering models. The functional conditions may include geometric conditions, including at least one of a gap between parts, a cumulative dimension, an area, and a volume within the assembly. The geometric conditions may indicate at least one of 1) whether parts can be assembled as defined in an assembly, 2) whether parts can operate within a required range of motion, and 3) whether a boundary condition of a part is violated. The functional conditions may include interactive physical conditions, including at least one of a mechanical force, a frictional force, a gravitational force, a velocity, an acceleration, an electrical current, a stress, and a thermal condition. The relation may include a user-entered definition governing the interaction of parts of the at least one model assembly.

The contributors may further include non-geometric properties of the at least one model assembly, including at least one of mass and material composition. The plurality of engineering models may include kinematic tolerance models. Determining the relation between the contributors and the functional conditions may include variationally solving a system of interdependent equations including values corresponding to 1) the geometric features of the plurality of model assemblies, 2) the functional features of the plurality of model assemblies, and 3) the geometric features of the at least one model assembly.

The method may further include receiving at least one of the plurality of engineering models and a user-entered definition via a network, the database being operated by a server connected to the network. A subset of computer applications that are required to access the engineering models may be identified. The contributors may include values corresponding to at least one of 1) dimensions of an initial assembly design, and 2) dimensions of an as-manufactured part. The change to the contributors may indicates a substitution of the dimensions of an as-manufactured part for the dimensions of an initial assembly design.

Updating the functional conditions may include: 1) identify the functional conditions affected by changed contributors based on the relation between the contributors and the functional conditions; 2) creating a list of a subset of the engineering models to be opened to compute the updates based on identified engineering models that compute the functional conditions; 3) accessing the subset of the engineering models via identified applications; 4) sending the changed contributor values to the subset of the engineering models; 5) using the subset of the engineering models to compute new functional condition values; and 6) retrieving updated functional condition values from the models. The database may be updated to correlate the contributors to the parts of the at least one model assembly.

Failure mode indications may be associated to the functional conditions. A report may be generated identifying at least one failure mode exhibited by the updated functional conditions. A criticality score for at least one contributor may be determined, the criticality score indicating at least one of 1) a severity of a failure mode associated with the contributor, 2) a quantity of functional conditions affected by the contributor, and 3) a degree of sensitivity of at least one functional condition affected by the contributor. A risk analysis may be determined for at least one functional condition, the risk analysis indicating a probability of a failure mode associated with the functional condition. A risk analysis may be determined for a part of the at least one model assembly, the risk analysis indicating a probability of a failure mode associated with the part. A risk analysis may be determined for a selected set of contributors, the risk analysis indicating a probability of a failure mode associated with the selected set of contributors.

The contributors may be identified from at least one of a computer-aided design (CAD) model, a statistical process control (SPC) system, and a metrology system. The database may be configured to indicate the updated functional conditions. The plurality of engineering models may include at least one table indicating at least a subset of the contributors and functional conditions.

The relation between the contributors and the functional conditions may be determined by parametrically solving a system of equations including values corresponding to 1) the geometric features of the plurality of model assemblies, 2) the functional features of the plurality of model assemblies, and 3) the geometric features of the at least one model assembly.

Further embodiments may include a computer-implemented method. Geometric features and/or functional features of a plurality of engineering models may be determined, each of the engineering models including a plurality of parts positioned in relation to one another in at least one assembly, the functional features including properties relating at least two of the plurality of parts. A first part present in each of the engineering models may be identified, and a function relating geometric features of the first part to the functional features of the plurality of engineering models may be determined. Geometric features of a second part may be determined, the geometric features of the second part including at least one dimension that is distinct from the geometric features of the first part. Based on the function, functional features of the plurality of engineering models may be updated as a result of substituting the second part for the first part in the plurality of engineering models. A report identifying at least one failure mode exhibited by the updated functional features may be generated.

The geometric features may include dimensions of each part of each of the plurality of assemblies. The functional features may include inter-part dimensions including at least one of a gap, an area, and a volume. A set of dimensional tolerances may be determined for the first part based on the inter-part dimensions. The functional features may include at least one inter-part force exerted between parts of the plurality of assemblies, the inter-part force including at least one of a gravitational force, a mechanical force, and a stress force. The functional features may include at least one constraint relating at least two parts of the plurality of assemblies.

A database storing the geometric features and functional features may be updated. Based on the database, the geometric features that are contributors to at least one of the functional features may be identified. A substitute geometric feature may be applied in place of one of the geometric features. A resulting set of functional features to which the substitute geometric feature is a contributor may be calculated, and at least one failure mode exhibited by the updated functional features may be identified.

Based on the updated functional features, a subset of the plurality of engineering models that is not associated with the at least one failure mode may be identified. The failure mode may indicate a degree of severity of a failure associated with substituting the second part in at least one of the plurality of assemblies. The failure mode may indicates a violation of a tolerance of at least one of the functional features.

A third part present in each of the assemblies may be identified, and geometric features of a fourth part may be determined, the geometric features of the fourth part including at least one dimension that is distinct from the geometric features of the third part. Updated functional features of the plurality of engineering models may be determined as a result of substituting the second part for the first part and the fourth part for the third part in the plurality of engineering models.

The updated functional features may be determined by variationally solving a system of interdependent equations including values corresponding to 1) the geometric features of the plurality of engineering models, 2) the functional features of the plurality of engineering models, and 3) the geometric features of the second part. The second part may include values corresponding to at least one of 1) dimensions of a revised part design, and 2) dimensions of an as-manufactured part.

Further embodiments may include a system comprising a database and a controller. The database may store geometric features and functional features of a plurality of engineering models, each of the engineering models including a plurality of parts positioned in relation to one another in at least one assembly, the functional features including properties relating at least two of the plurality of parts. The controller may be configured to: 1) identify a first part present in each of the assemblies; 2) generate a function relating geometric features of the first part to the functional features of the plurality of engineering models; 3) determine geometric features of a second part, the geometric features of the second part including at least one dimension that is distinct from the geometric features of the first part; 4) determine, based on the function, updated functional features of the plurality of engineering models as a result of substituting the second part for the first part in the plurality of engineering models; 5) update the database to incorporate the updated functional features; and 6) generate a report identifying at least one failure mode exhibited by the updated functional features.

Further embodiments may include a computer-implemented method. Geometric features and functional features of a plurality of engineering models may be determined, each of the engineering models including a plurality of parts positioned in relation to one another, the functional features including properties relating at least two parts of an assembly. A function relating the geometric features of to the functional features of the plurality of engineering models may be generated. A geometric variation to the function may be applied to determine updated functional features, the updated functional features indicating a result of implementing the geometric variation in the plurality of engineering models. A report identifying at least one failure mode exhibited by the updated functional features may be generated.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

Figure 11:
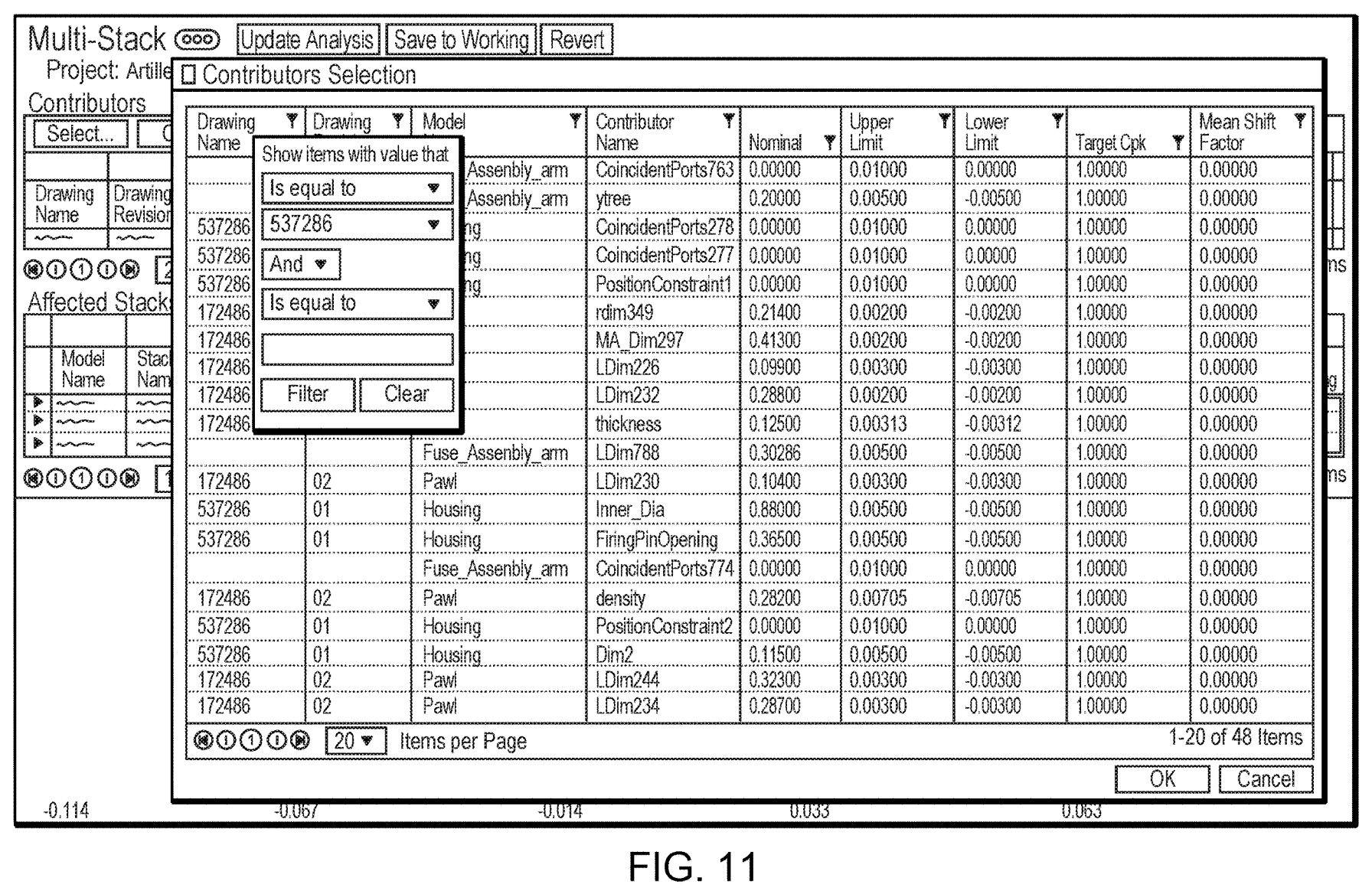

FIGS. 6-15 illustrate portions of an example user interface that are displayed during a management process in an example embodiment.

DETAILED DESCRIPTION

Figure 1:
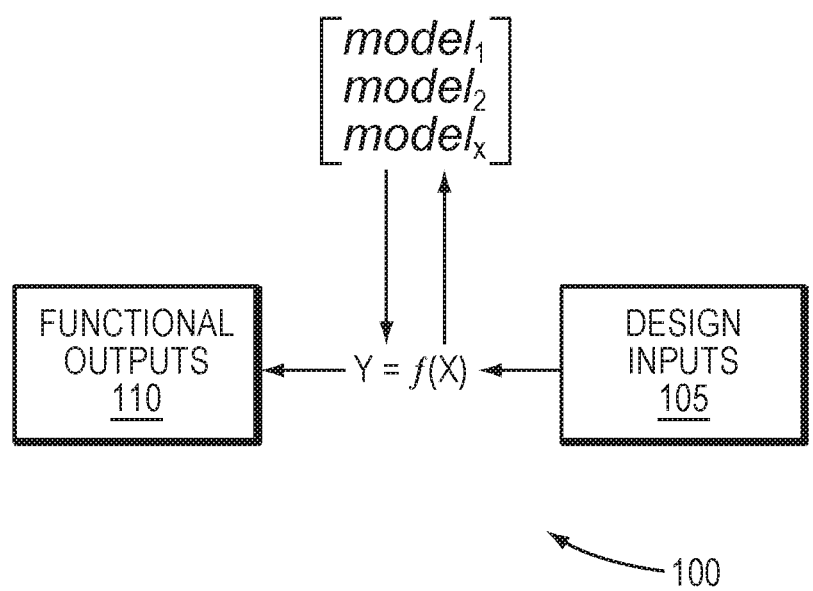
FIG. 1 is a flow diagram illustrating a relation between design and performance of a product.

A description of example embodiments follows.

Embodiments of the present invention relate to computer-aided design (CAD) and associated methods and systems for designing, modeling and simulating objects in 3D. More particularly, embodiments relate to the technical fields of 3D Variational Design and 3D Conceptual Design, 3D Force Analysis, and 3D Tolerance and Variation Analysis.

Glossary of Terms

Constraint Server (CS): A CS is a computer-implemented application used to solve and maintain mathematical and/or geometric relationships (e.g., y constrained equal to 2 times x, lines constrained to be parallel or perpendicular, a line constrained tangent to a circle).

Variational: Refers to a method of solving non-directed relationships. For example, a variational system could solve for x in the relationship $2x+5=3x^2-2$. In this case, x on the left side of the equation depends on x on right side of the equation, and vice versa. Or if the equation were written as $2x+b=ax^2-c$, and sufficient other relationships were defined in terms of a, b, c, and x, thereby creating a system of interdependent equations, a variational system would be able to solve the system of equations (assuming a solution exists).

Dependency Manager: A dependency manager is an ability included with a CS, or a software program that utilizes a CS, that enables the automatic identification of contributors to a functional condition.

Functional Condition (or Functional Output, or "y"): A quantitative value relevant to the function or quality of a product that is computed by an engineering model or by use of an equation. Ultimately it is a property that is produced by a design.

Functional Performance—The functional performance of a design refers to how well the design meets the required Functional Outputs Stack: A stack is a specialized Functional Condition. It is a derived property of a manufactured product that is critical to the quality and performance of the product but cannot be directly controlled by manufacturing because it is the cumulative effect of properties (e.g., dimensional specifications) that are controlled by manufacturing. Stacks are evaluated via a tolerance analysis process to determine the range of values (the Stack variation) that may result from the cumulative variation of the Stack contributors.

Contributor (or "x"): Any contributor to the computation of a Functional Condition, including the variation of a Functional Condition. Contributors include dimensional and non-dimensional contributors.

Dimensional Contributor: A dimensional contributor contributes to the computation of one or more functional conditions. It is a dimensional specification for a geometric feature on a component or assembly drawing. Dimensional specifications include tolerance limits that are used by manufacturing to determine whether geometric features are within specification limits. Dimensional contributors are typically defined with nominal values and tolerances. Dimensional contributors are combined with other contributors to compute functional conditions and especially to compute Stack variation results.

Non-dimensional Contributor: A non-dimensional contributor is any contributor to a functional condition or stack that is not a dimensional contributor. Non-dimensional contributors typically include parameters of physical phenomena (e.g., friction coefficient, temperature, pressure). Non-dimensional contributors are specified with a variation range (tolerance range) when used to compute the variation of functional conditions and stacks. The tolerances of non-dimensional contributors are generally not controllable in manufacturing.

Engineering Model (or "f"): A mathematical model implemented in software (typically using a Constraint Server) that can simulate the interaction of Contributors and compute Functional conditions.

Kinematic Tolerance Model: A specialized Engineering Model that can compute Functional Condition variation (tolerance analysis) results, and update those results in response to Contributor value changes. A Kinematic Tolerance Model may be an assembly model with component models, all of which function together as a Kinematic Tolerance Model. The component models may contain their own Contributors such that Functional Condition results at the Assembly level are a result of the interaction of the component models and the Contributors within those models.

Metrology: Metrology is the application of measurement technology and methods to determine the as-manufactured values of Contributors, and thus determine whether Contributor values are within their tolerance specification limits.

SPC System: An SPC (Statistical Process Control) system is used with metrology systems to control quality during manufacturing.

Design Inputs: Specifications that define a design.

Disposition: A disposition is a decision during a manufacturing process that determines how a nonconforming part (i.e., a part with one or more contributor values outside of their tolerance specification limits) will be used (e.g., reworked, used as-is) or scrapped. Disposition may include changing specifications to match the as-manufactured condition.

Failure Modes and Effects Analysis (FMEA): "Failure modes" refers to the ways, or modes, in which something might fail. Failures are any errors or defects, especially ones that affect the customer, and can be potential or actual. "Effects analysis" refers to studying the consequences of those failures. Failures are prioritized according to how serious their consequences are, how frequently they occur and how easily they can be detected. The purpose of the FMEA is to take actions to eliminate or reduce failures, starting with the highest-priority ones.

Example embodiments described herein provide a system and method for performing Functional Relationship Management (FRM) to rapidly generate information valuable to the product development process by managing Design Inputs, Functional Outputs, and the models that compute the Functional Outputs from the Design Inputs.

FIG. 1 is a flow diagram illustrating a relation 100 between design and performance of a product. Product development can be understood as a process in which engineers optimize Design Inputs to achieve optimal Functional Performance. If we represent the Design Inputs 105 as x's and the Functional Outputs 110 as y's, we can represent the design domain as:

$$\begin{bmatrix} y_1 \\ y_2 \\ y_j \end{bmatrix} = f \begin{bmatrix} x_1 \\ x_2 \\ x_n \end{bmatrix} \quad \text{(Equation 1)}$$

Here, "f" is the set of models used to compute the Functional Outputs given the specific set of Design Inputs engineers create engineering software models to simulate, analyze, and understand the relationships between the x's and y's. Multiple software models may be required to describe all the functional relationships. If we use X to represent the set of x's and Y to represent the set of y's we can write:

$$Y = f(X) \quad \text{(Equation 2)}$$

With reference to "f" in the equation above we can represent the role of the models as:

$$f = \begin{bmatrix} model_1 \\ model_2 \\ model_x \end{bmatrix} \quad \text{(Equation 3)}$$

Combining equations 1-3 provide a functional relation 100 as depicted in the flow diagram of FIG. 1.

Example embodiments include a Functional Relationship Management (FRM) system that implements the functional relation 100 to manage design and production of a product. As a design evolves, there are many sets of as-designed values, and during manufacturing, there are many sets of as-manufactured values. Additionally, the sets of models may be modified along the way. The FRM system may maintain a complete product history from design through manufacturing, including the Design Inputs, the Functional Outputs, and the sets of models. The FRM system may manage the relationships between inputs (x's), outputs (y's), and the models that compute the outputs from the inputs. It enables different sets of x's to be entered to compute new sets of y's, given any previously saved set of models. Additionally, when an FRM is coupled with a Constraint Server, the system can be used to automatically identify x's affecting y's, and help to automate the population of the FRM database. Examples of Constraint Servers are described in U.S. Pat. Nos. 7,623,139 and 9,384,591, the entirety of which are incorporated herein by reference.

The FRM system may be connected to other systems to input additional sources of x values. For example, the FRM can connect to a CAD system to retrieve sets of updated as-designed x values. Or it can connect to metrology and SPC systems to retrieve as-manufactured x values. We can also use statistical data as x inputs and have the system use the models to compute statistical projections for y's.

On the output side, the FRM system can be connected to systems that have additional data pertaining to the y values. For example, we can connect to an FMEA system to retrieve failure mode information pertaining to y values. We can add functional limits for y values and the failure modes associated with each functional limit.

With the addition of functional limit and failure mode information provided by the FRM system, a user with no knowledge of the models, no knowledge of how the y's are affected by the x's, and no knowledge of the failure modes associated with the y's, may perform the following using the FRM system:

a) Identify an 'x' from a CAD drawing;
b) Enter new values for the 'x' such as as-manufactured data;
c) Have the system send the x values to the appropriate models to compute new y values;
d) Determine whether the new y values are outside of the functional limits;
e) Identify failure modes that may be triggered based on the as-manufactured condition;
f) Compute a probability of each failure mode; and
g) Perform comprehensive risk analysis of all failure modes given the x values;

The FRM system may be implemented as a cloud-based system with a web-based interface so that any device supporting a web browser (e.g., smart phones, tablets, computers) may access the system. The system may also be implemented in one or more computer systems, such as a workstation or mobile device. The FRM system may also accommodate both the manual and automated entry of x's. Users may manually enter data, or as-manufactured data entry may be automated via interfaces to Metrology systems (for example).

In example embodiments, an FRM system may be implemented in applications throughout the product development processes. In earlier phases, the user may want to compare and evaluate proposed design changes. In later phases, the "as-manufactured" data may replace the "as-designed" data in order to compare the as-manufactured Functional Conditions with the as-designed Functional Conditions.

The FRM system may also be implemented using a wide variety of models. Any analysis system capable of computing new outputs when inputs are changed may be loaded onto the system server and used as a model for the FRM system. Thus, any property of a product that can be simulated and computed by a computer system can be treated as a "y", i.e., a property that is the cumulative result of Design Inputs. The Design Inputs and Functional Outputs can both be managed by the FRM system, and the appropriate analysis engine invoked when necessary to compute new results from the appropriate sets of models.

Figure 2:
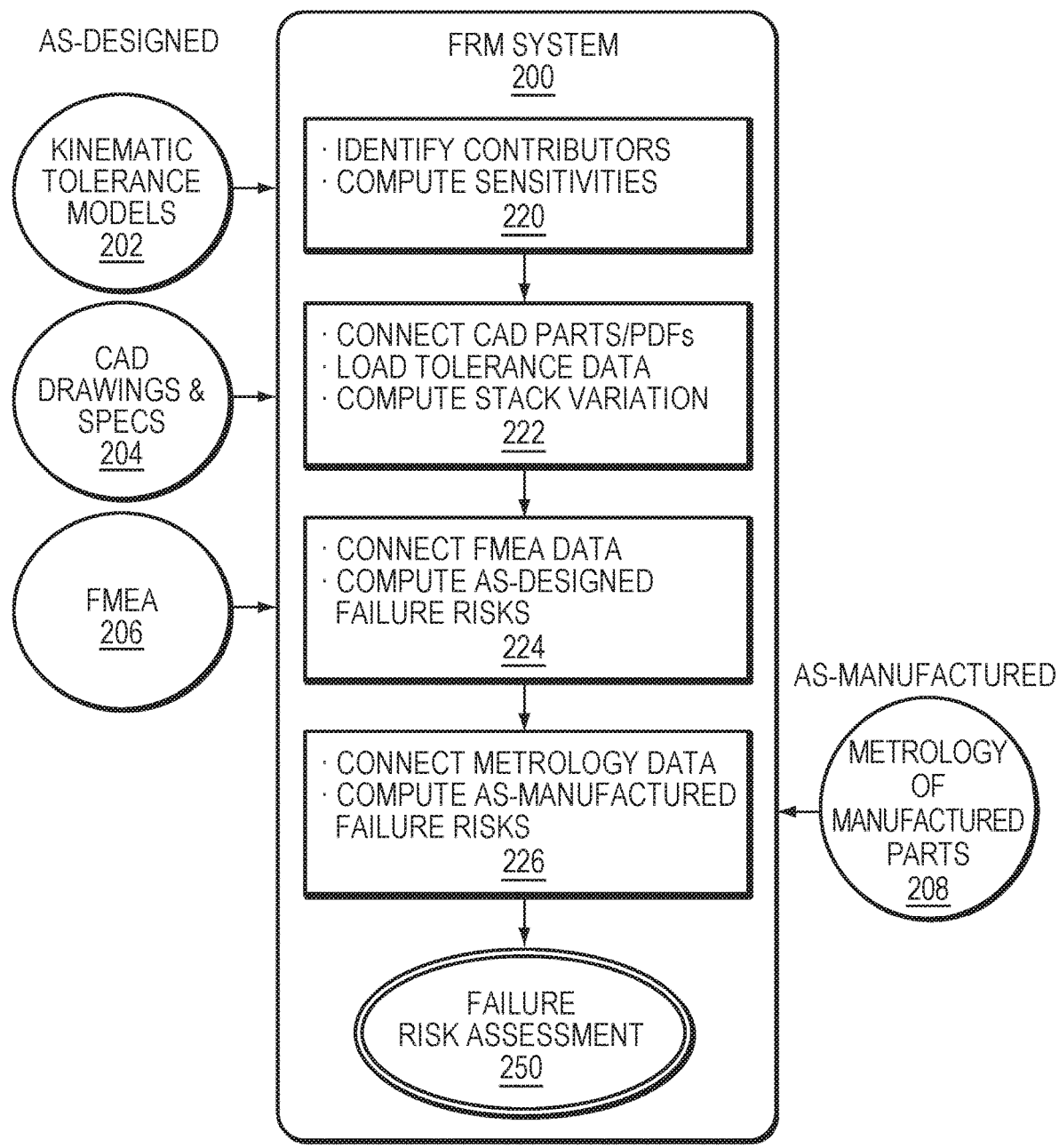
FIG. 2 is a diagram illustrating operation of a functional relationship management (FRM) system in an example embodiment.

FIG. 2 is a flow diagram illustrating operation of a FRM system 200 in an example embodiment. Among other advantages, the FRM system 200 can provide for rapidly generating information valuable to the disposition of nonconforming parts (e.g., parts failing to meet dimensional specifications) during the manufacturing process.

The FRM system 200 may manage a database and connect multiple sources of data and analysis methods in such a manner that information vital to disposition, previously unavailable within the time constraints of the disposition process, is now available almost immediately. Such connected sources may include Engineering Models (e.g., Kinematic Tolerance Models) 202 with CAD data 204, FMEA data 206 associated with the Functional Conditions, and Metrology data 208. When a part is found to have nonconforming Contributors (as determined by comparing the Metrology data with the CAD data), those four data sources can be combined to quickly compute the probability of exceeding functional limits and thereby triggering failure modes identified by FMEA, a failure index, and various other metrics to help the user analyze and explore the effects triggered by the deviation.

Under previous approaches, because time and cost constraints require rapid disposition decisions, manufacturers have relied on historical experience coupled with improvised handwork solutions and luck. Lacking the type of data generated by example embodiments, disposition decisions may be inaccurate or inconsistent. Recalls, warranty repairs, product failures, and excess scrap are the casualties of disposition decisions where the gamble fails to pay off.

The Kinematic Tolerance Models 202 may contain the Functional Conditions and their Contributors. The FRM system 200 may process the models 202 to identify the Contributors and compute the percentage contribution of each Contributor to the Functional Conditions (220). This result informs the user which Contributors are therefore more prone to cause variation in the Functional Conditions.

The FRM system 200 may then incorporate the CAD data 204 by including the CAD part numbers for each corresponding component and assembly in the Kinematic Tolerance Model 202 (222). Concurrently, individual objects in the CAD data 204 may be associated with the corresponding Contributors and Functional Conditions of the Kinematic Tolerance Models 202 by using the CAD part number information stored in the Kinematic Tolerance Models 202. Tolerance information from the CAD data 204 may then be associated with each Contributor and Functional Condition. The Tolerance information can be used to compute how tightly each Contributor needs to be controlled during the manufacturing process.

As part of the CAD data, CAD PDF files (e.g., drawings) of the components may be loaded into the database. In doing so, the CAD part numbers may be used to link the proper CAD drawing with the appropriate component and assembly models in the Kinematic Tolerance Models, thereby linking the CAD drawings with the Contributors. The association with CAD Data and PDF files can be performed either manually by users, or automatically via interfaces to CAD programs. Additional configurations of a single assembly may be loaded to ensure that desired Functional Outputs can be maintained at multiple configurations.

The FMEA data 206, which is associated with each Functional Condition, may be loaded into the database either manually by users, or automatically via interfaces to FMEA programs (224). The FMEA data specifies a failure severity rating indicating a relative importance of each Functional Condition failure to the quality of the final manufactured product.

The FRM system 200 may load the Kinematic Tolerance Models 202 onto a server networked with the system in a manner that enables the system to send Contributor data to the Kinematic Tolerance Models 202. The Kinematic Tolerance Models 202 may then be used to compute new Functional Condition results, and send the results back to the FRM system 200. Once the Kinematic Tolerance Models are loaded onto the FRM system 200 server, the models may become complex "function calculators" that compute new Functional Condition results in response to Contributor changes sent from the FRM system 200. After the new results are computed, the models 202 may be returned to their original state. Other than using the models 202 as function calculators managed by the system 200, users may optionally be restricted from accessing the models and, thus, the integrity of the models 202 can be maintained.

After the functional relations between Contributors and Functional Conditions have been identified and stored in the database, along with the Engineering Models used to compute updates to Functional Conditions in response to Contributor changes, Metrology information 208 may be received about manufactured parts, which inform the FRM system 200 of as-manufactured tolerance ranges of the Contributors (226). These new Contributor data may be fed into the FRM system 200, updating the Kinematic Tolerance Models 202, and new results may be computed for the potential variation of each Functional Condition. Using the Functional Condition results and the FMEA information 206, the FRM system 200 may then compute new risk assessment of each Failure Mode, and a failure mode index for each Functional Condition that users may use to assess failure risks for each Functional Condition, and various other metrics to inform the user and determine the effects triggered by the deviation (250).

FIGS. 3-15 illustrate an example process of design, development and evaluation of a product using an FRM system in an example embodiment. The example process is directed to an artillery shell arming device. Such a device may have at least the following critical functional requirements. First, in an unarmed condition, it must prevent accidental detonation of the shell during transport and handling. Second, in an armed condition, it must enable detonation on impact after the shell is fired. Third, it must become armed at 2200 RPM. Because the critical functions occur under different operating conditions it is helpful to use different models for the evaluation of the armed and unarmed conditions.

Figure 3:
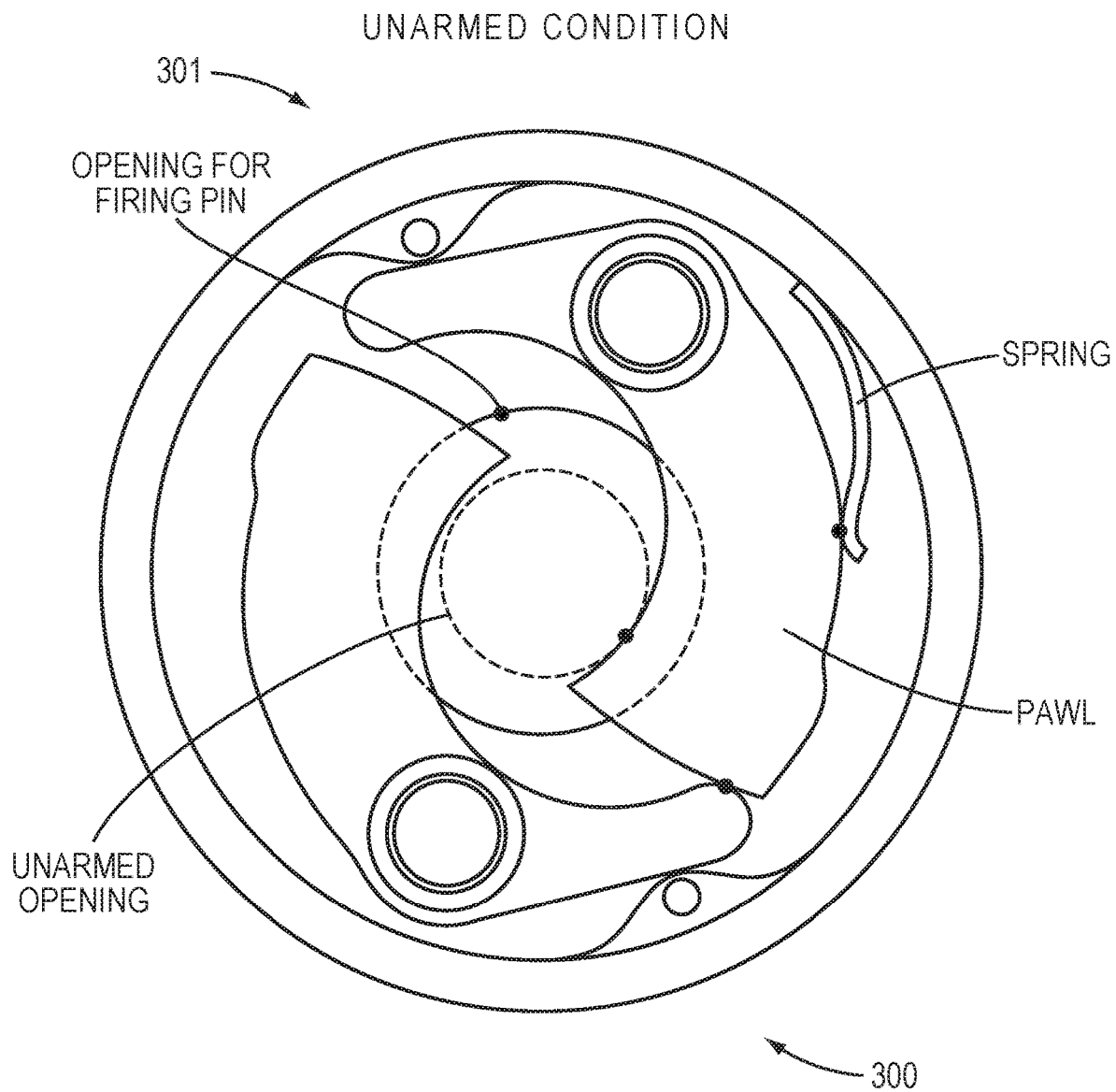
FIGS. 3-5 illustrate example engineering models of mechanical assemblies in one embodiment.

FIG. 3 illustrates a top-down, cross section view of an assembly model 301 for the shell arming device 300 in the unarmed condition. Before a shell is fired, a spring in the arming device forces pawls into the closed position, preventing the firing pin from detonating the shell. The spring forces the pawl on the right into contact with the housing at the top. Therefore, the unarmed condition is evaluated with the pawl in this contact position.

The dashed circle is used to determine the diameter of the unarmed opening. If the diameter of this circle exceeds the firing pin diameter then the shell can be detonated during transport, violating this critical functional condition. The diameter of this circle is a Functional Condition ("y") that is affected by many Contributors ("x"). A Constraint Server is used to automatically identify all Contributors that affect this important Functional Condition. Analysis of this Functional Condition requires determining its variation given the possible variation of the Contributor values.

Figure 4:
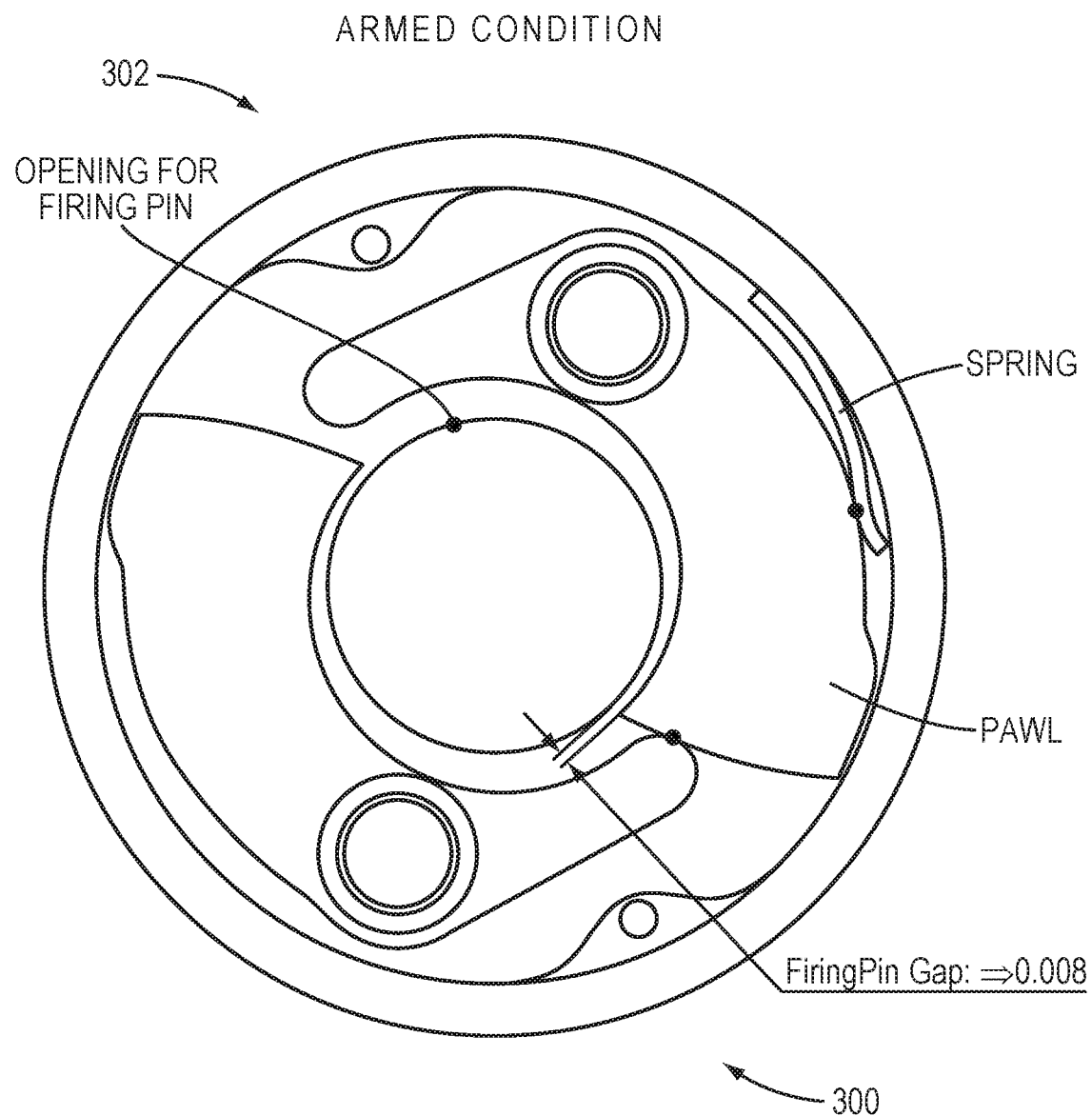

FIG. 4 illustrates an assembly model 302 for the shell arming device 300 in the armed condition. When the shell is fired, centrifugal force resulting from the spin of the shell overcomes the force of the spring and forces the pawls to rotate into the open position. This is the armed condition because the firing pin can travel through the opening and detonate the shell.

The specifications require that the shell be in the armed condition when the shell is spinning at a speed of 2000 RPM or higher. At this speed, a gap opens between the firing pin and the pawl. We can analyze this gap to determine the reliability of becoming armed at 2000 RPM.

The gap is a Functional Condition that is affected by many Contributors. A Constraint Server with a Dependency Manager can be used to automatically identify all Contributors that affect this important y. Analysis of this Functional Condition requires determining its variation given the possible variation of the Contributor values.

Figure 5:
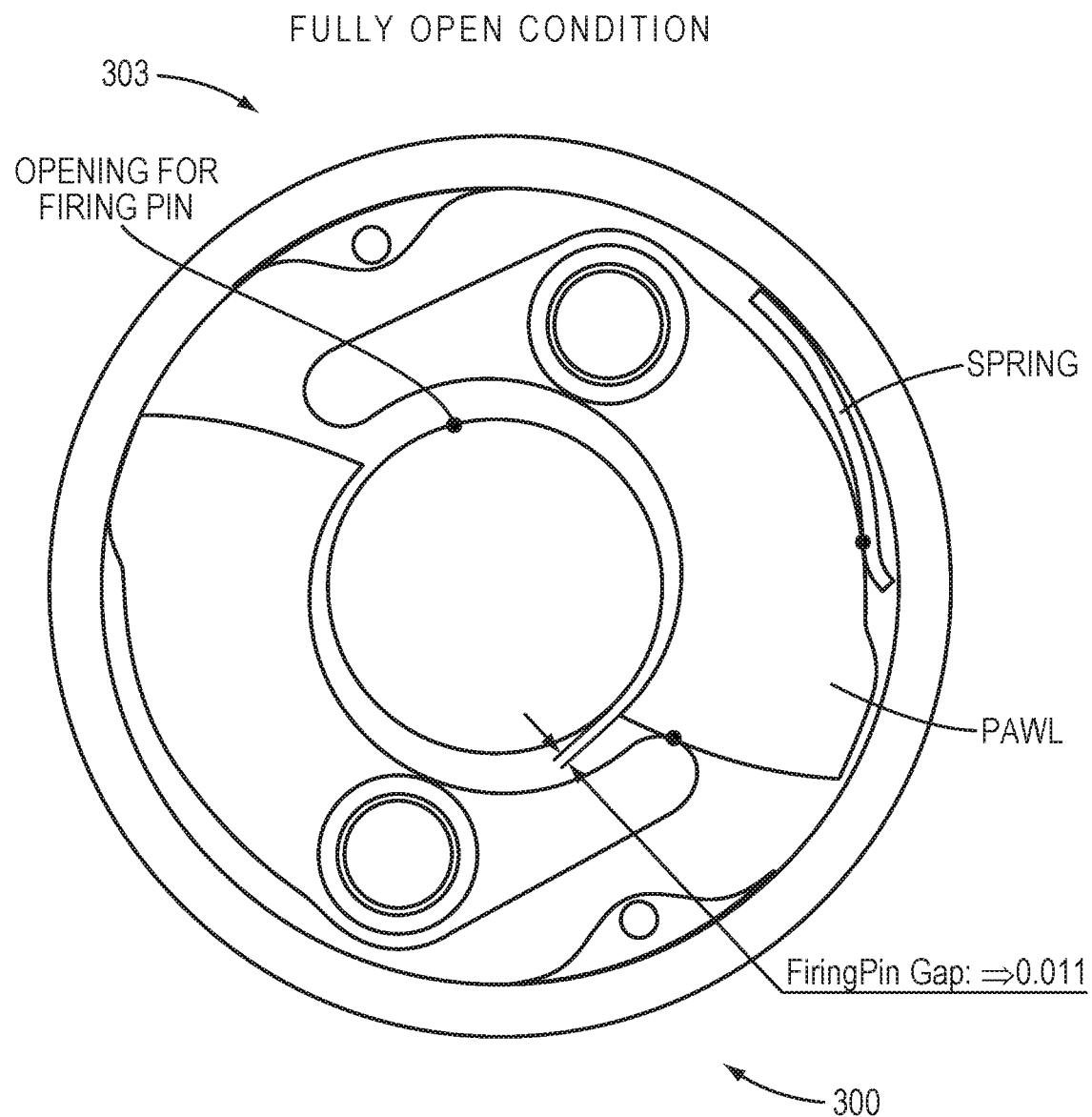

FIG. 5 illustrates an assembly model 303 for the shell arming device 300 in the armed condition. As the shell spins faster, the left pawl will come into contact with the housing, limiting the pawl rotation. A third model is used to simulate this fully open position. This model can be used to analyze the variation of the Firing Pin gap in the fully open position.

All three model assemblies 301-303 may share the same components (e.g., parts). To evaluate the full range of operation of the device 300, the model configurations may be required due to the different operating conditions that may be encountered.

For an FRM system using a Constraint Server as described above, the ability to automatically identify the Contributors that affect each Functional Condition can be used to rapidly populate the FRM database. The steps of such a process may include:

a) The user browses to a directory containing the Kinematic Tolerance Models that will be used to compute the Functional Conditions as a function of the Contributors and directs the FRM to upload the models.

b) The FRM opens each model and identifies all Functional Conditions in the models. Multiple Functional Conditions may exist in a model.

c) The FRM adds the list of Functional Conditions to its database and stores the information about which model computes each Functional Condition.

d) The FRM requests the Constraint Server to identify the Contributors that affect each Functional Condition.

e) The Constraint Server reports the list of Contributors for each Functional Condition to FRM, including the component to which each Contributor belongs, and the relevant values of the Contributor.

f) The FRM system populates the database with the Contributor information for each Functional Condition.

Figure 6:
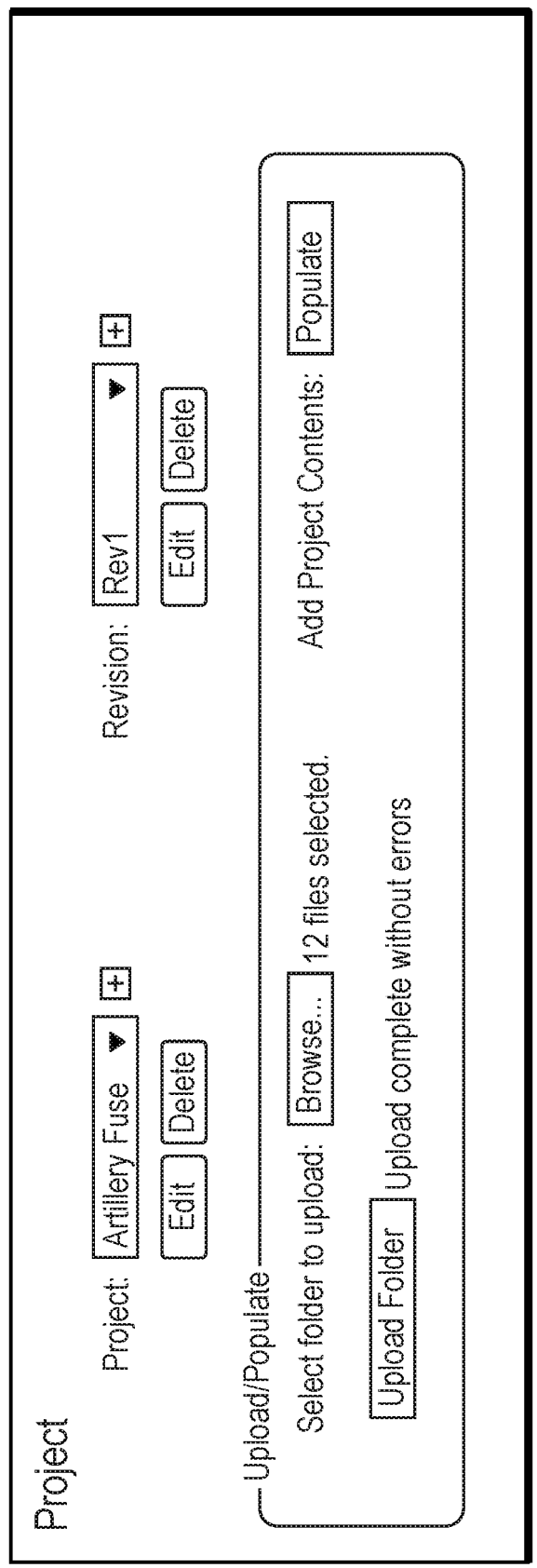

FIG. 6 illustrates a portion of a user interface through which a user may interact with the FRM system to carry out the above process. The first step is to select a folder containing the models that will be processed with the Constraint Server. During the file Upload process, the files are validated to ensure that there are no errors. As shown in FIG. 6, after the Upload is completed without error the user clicks on the "Populate" button. This instructs the system to open the Kinematic Tolerance Models and use the Constraint Server to identify all Functional Conditions in the model and identify all Contributors that affect the Functional Conditions. Alternatively, instead of using the automated method for populating the database, the user may manually add models, Stacks, Contributors, and functional relationships between them.

Figure 7:
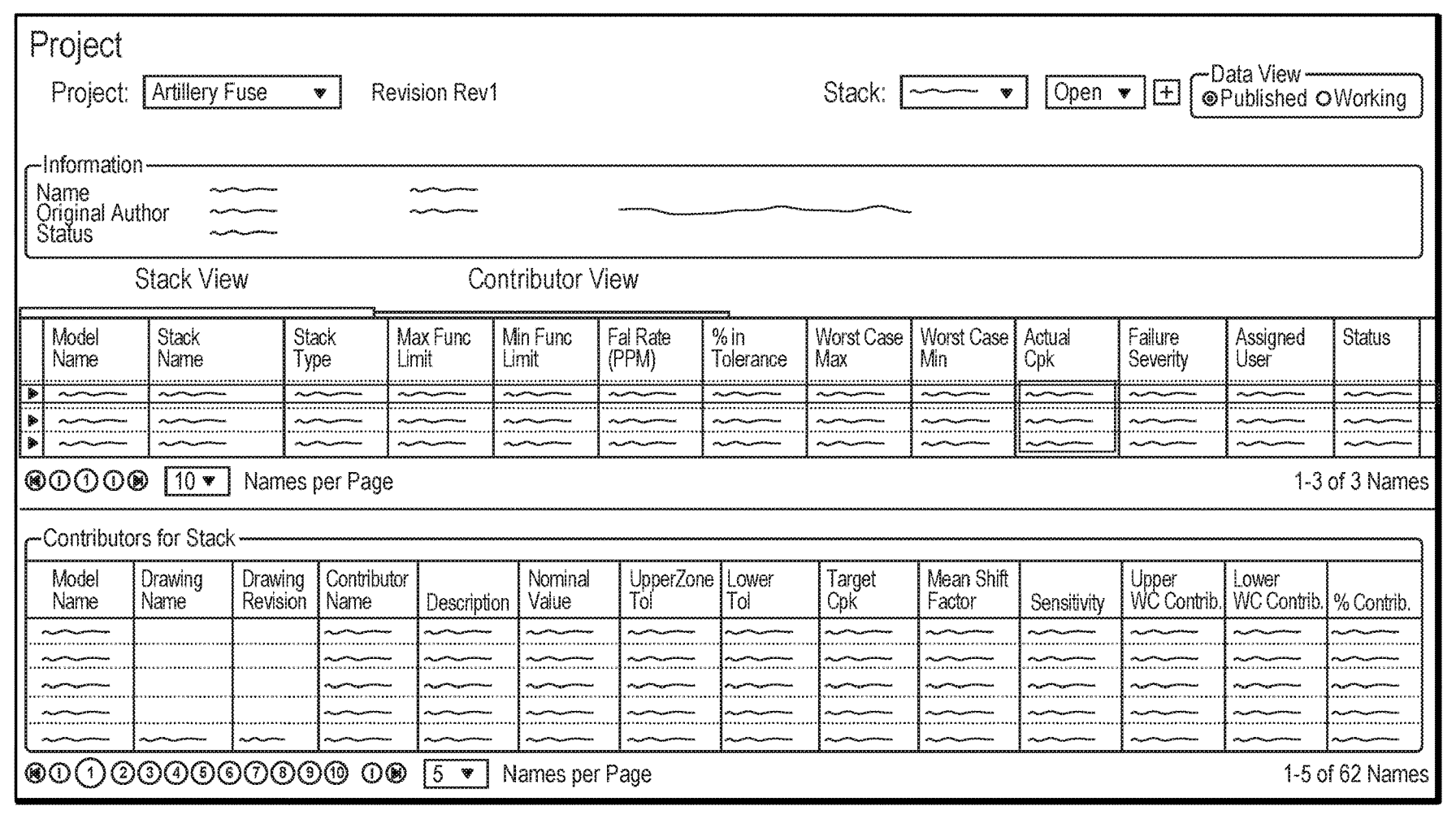
Figure 8:
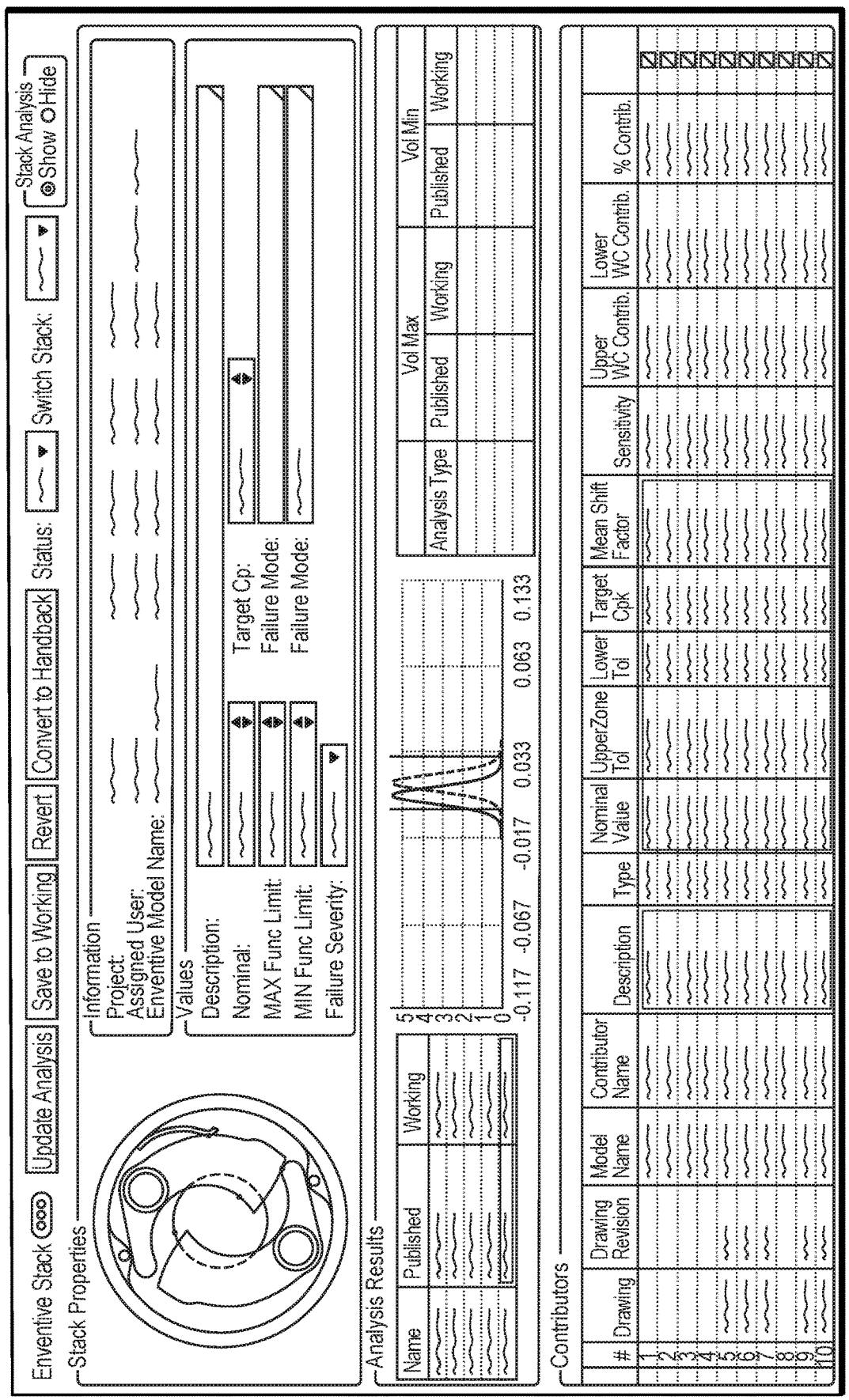
Figure 9:
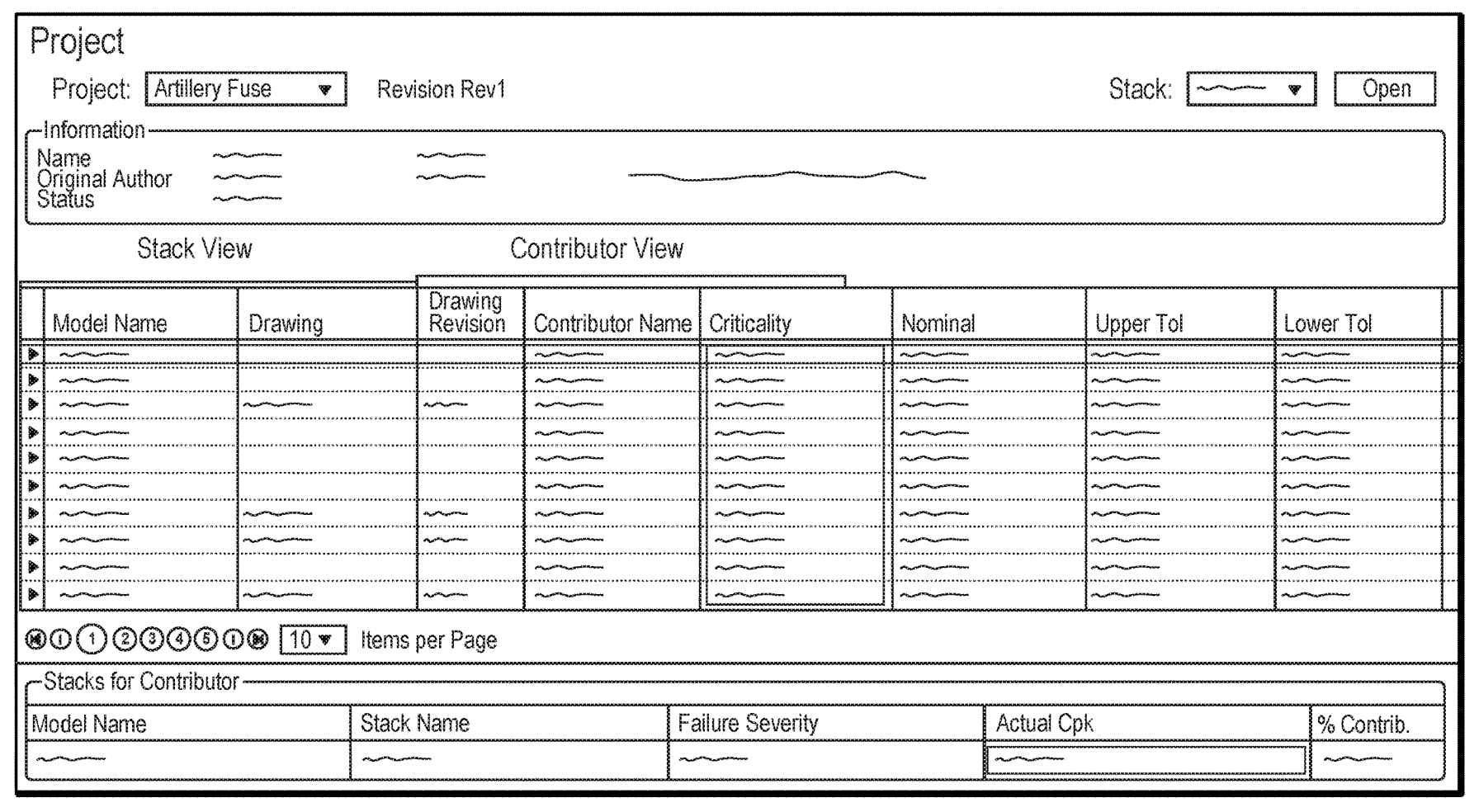

FIG. 7-15 illustrate portions of a user interface illustrating data organized in the FRM database. As shown in FIG. 7, the FRM database has now been populated with the data provided by the Constraint Server. The Stacks are listed in the upper portion of the window. Contributors for the selected stack are listed in the lower section of the window. The initial values are treated as "Published" values. Published values are a set of Stack and Contributor values shared by all system users. All users see the same published values. As shown in FIG. 8, a Stack can be opened to add further information such as functional limits, failure modes and failure severity. Failure mode and severity information can also be supplied from a separate FMEA system.

The Stack failure severity values, the probability of the stack being within the functional limits, and percentage contribution of each Contributor to all affected stacks are used to compute a criticality score for each Contributor. These values are shown highlighted in FIG. 9.

Figure 10:
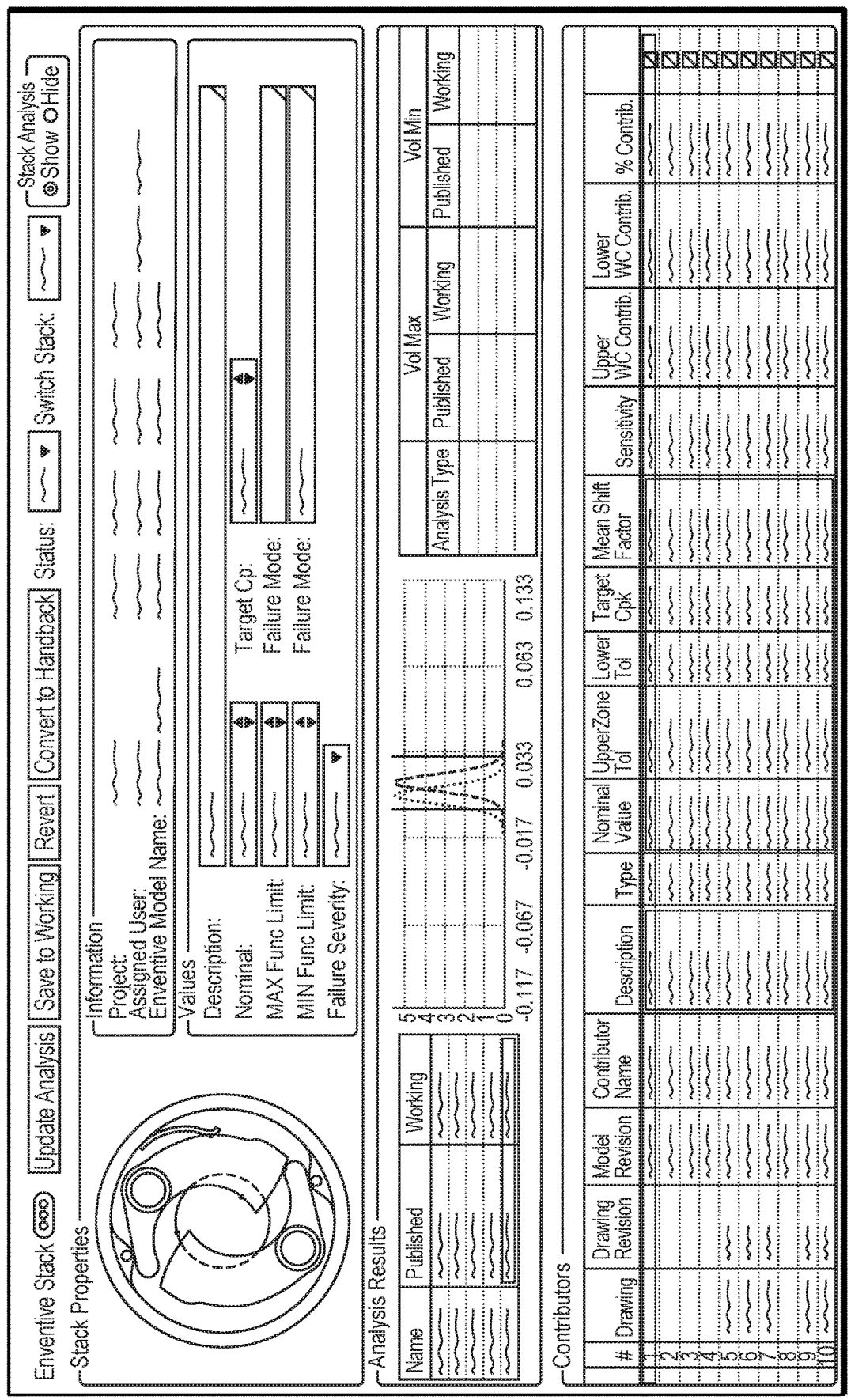

Returning to the Stack detailed view in FIG. 10, it can be observed that a second set of Contributor values labeled "Working" values are displayed in the Results section. Working values may be generated using a new set of Contributor values. Each user may have his/her own set of working values. In other words, the FRM system can manage separate sets of Contributor values for each user. These separate Contributor values may be used to generate separate sets of working Stack values. The FRM system may send the Contributor values to the appropriate models that are then used to compute the working Stack values. The user can create new Contributor values by changing values in the cells highlighted as shown in FIG. 10. These changes are marked with a small triangle in the upper left corner of the cell.

Because each user may have his/her own set of working values, users may work in parallel exploring design improvements. In this example design, improvements are clearly needed because the probability of being within the functional limits is far too low, especially given the failure severity. The FRM system can provide a solution to examine the working results of other users so that decisions can be made about accepting proposed changes. The accepted changes can then become the new Published values shared by all users.

After a design has stabilized, Contributor values are specified in a CAD system that produces drawings for specification control. At some point in the process, the CAD models and drawings come under release control, typically managed by a product data management (PDM) system. The CAD system becomes an alternate source of Contributor values for the FRM system. When design changes occur in the CAD system the revised set of Contributor values can be imported from the CAD system. The FRM system may update all affected Stacks with the new set of Contributor values from the CAD system.

After manufacturing commences numerous sets of Contributor values are generated every day. A user from manufacturing can enter a new set of working values based on as-manufactured data, and have the system compute new Stack values based on the set of as-manufactured Contributor values.

The manufacturing user may enter values based on a reference to a Drawing number. The FRM system may provide an ability to select Contributors based on drawing numbers. As shown in the contributor selection interface of FIG. 11, the user has filtered the Contributors to display only those belonging to drawing 537286, the part number for the Housing. As shown in FIG. 12, the user has selected the Inner diameter from the list of Contributors for the Housing (drawing 537286).

Figure 13:
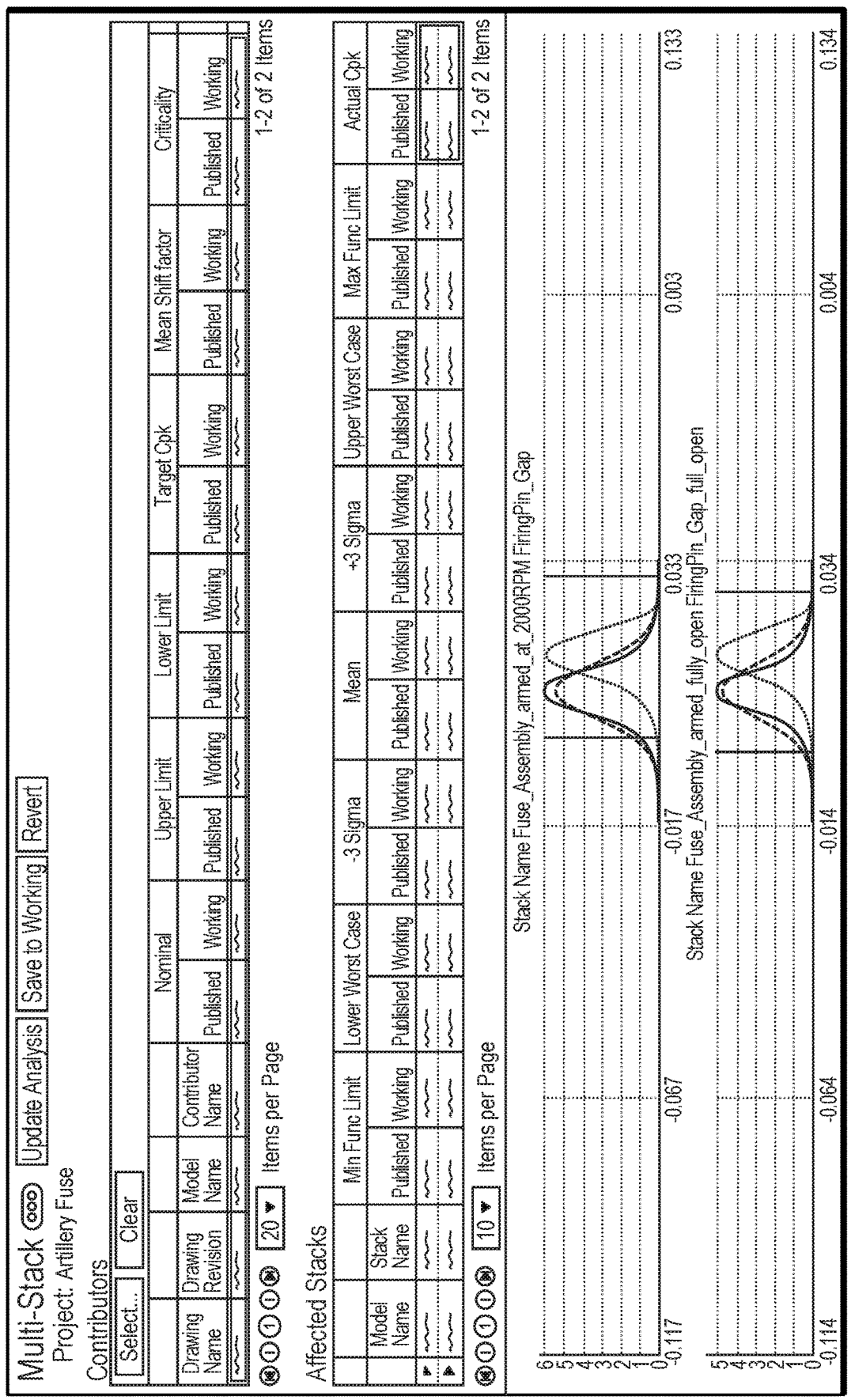

As shown in FIG. 13, in response to the selection, the FRM system now displays all of the Stacks affected by the selected Contributor. Although not shown, the user may have selected multiple Contributors. The system would display the set of Stacks affected by the selected set of Contributors. The user may now enter as-manufactured values for the selected Contributor.

Figure 14:
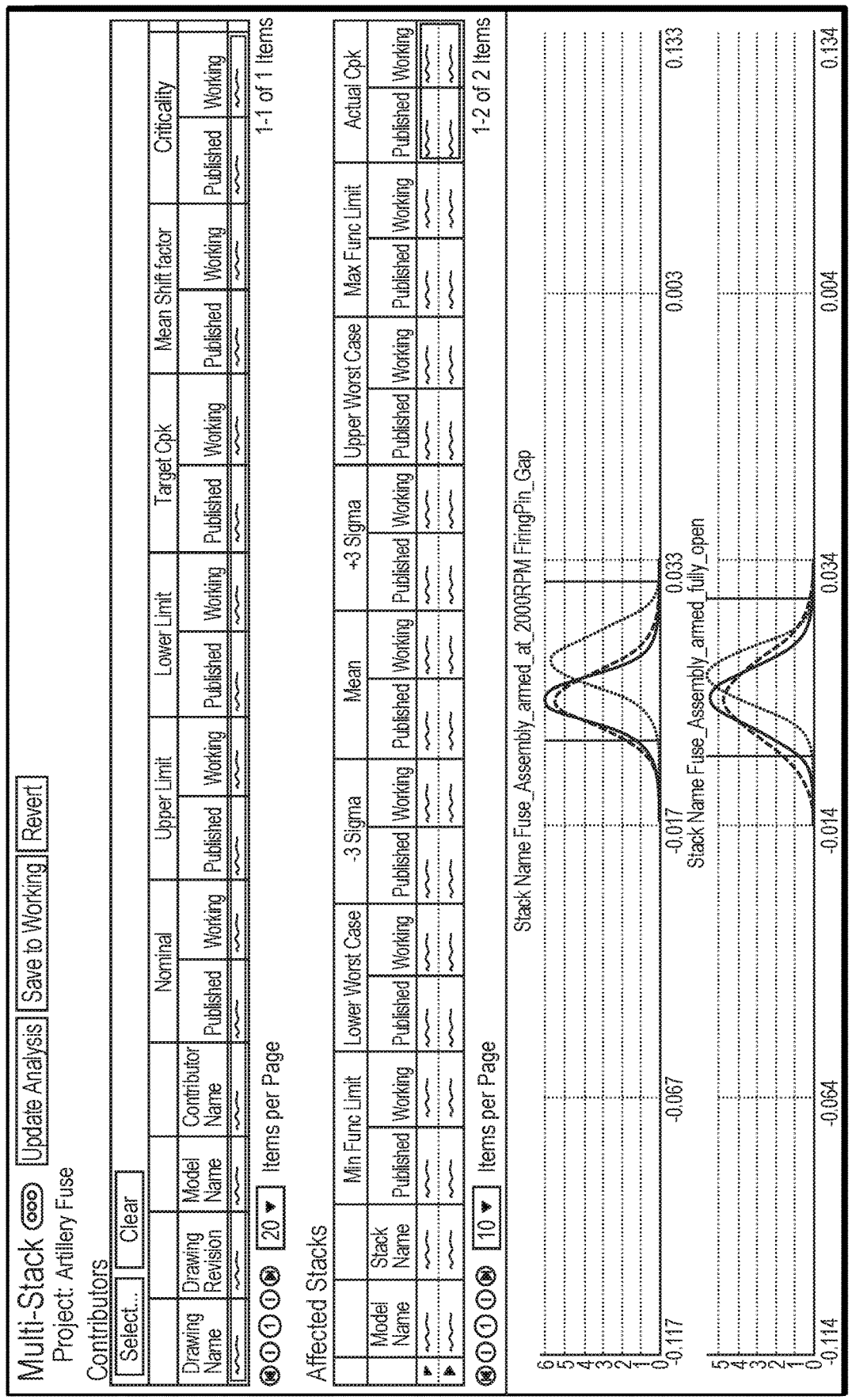

The system may then send those values to the appropriate models and compute new Stack values that will be displayed as working values for each Stack, as shown in FIG. 14. Here, the system may also display an updated criticality score for the selected Contributor(s). The Cpk score for each affected Stack conveys the probability of failure, which is high in this example. Low Cpk scores are highlighted. The user can navigate to the other pages in the system to identify failure modes and failure severities associated with stacks with low Cpk scores.

Figure 15:
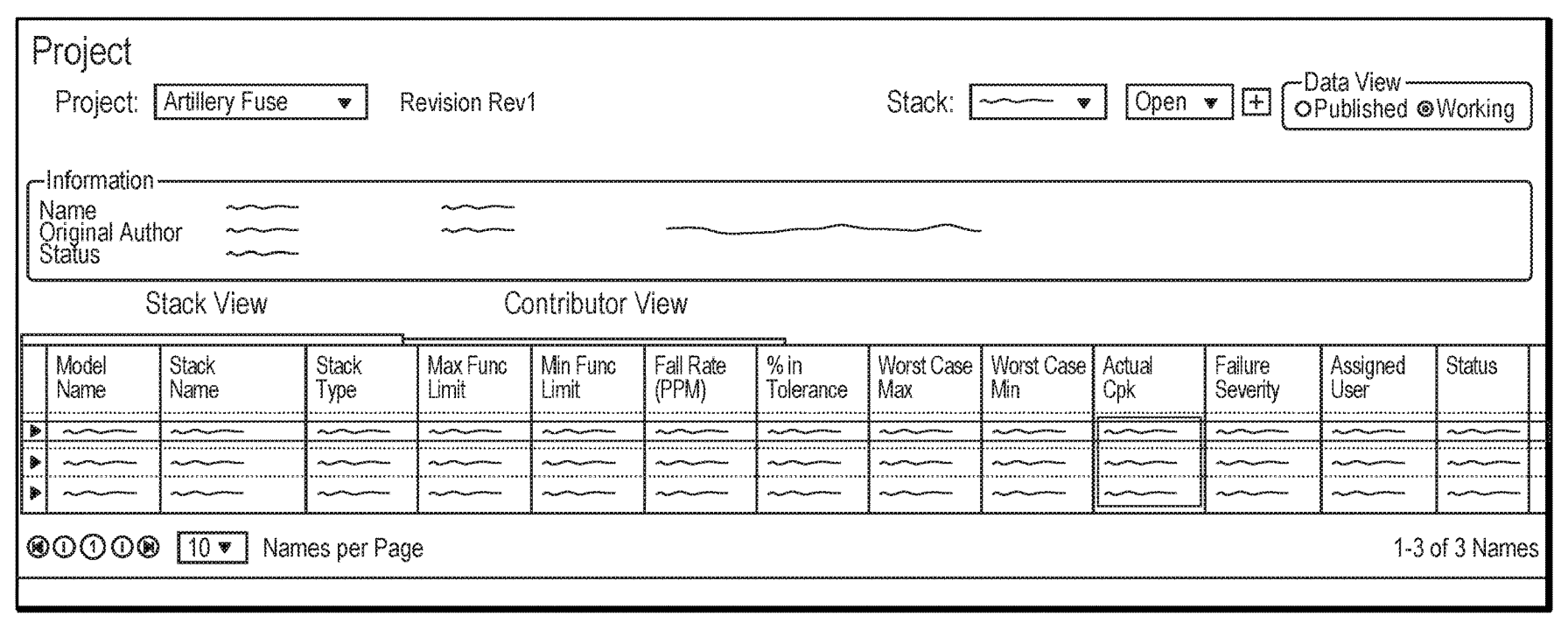

In another view, shown in FIG. 15, the system displays failure severity adjacent to Cpk scores, enabling users to assess the risk when Cpk scores are low.

In order to address the low Cpk scores, upon investigation, the user can identify a need to increase the inner radius of the pawl. After making the necessary change, the system opens the appropriate models, sends the new contributor value to the models, and updates results. The new Cpk results are now all within specification, and the design can be released to manufacturing.

In summary, example embodiments provide a FRM system that uses engineering models as function calculators that compute Functional Conditions (y's) as function of Design Inputs (x's). The FRM system may organize and manages diverse sets of x's from diverse sources, computing y's for each set of x's. Published x's and resulting y's are shared by all users. Each user has his/her own set of working x's, with the resulting set of working y's. Sets of x's may also come from other sources such as CAD models and as-manufactured data. The FRM stores all sets of all x's and resulting y's so that there is a complete history of x's and y's from design through manufacturing.

When used with a modeling system that includes a Dependency Manager, the FRM system may be automatically populated by using the ability of the Dependency Manager to identify all x's that affect a y in a given Engineering Model. The FRM system may also supports the ability for users to manually add models, y's, x's, and functional relationships between the x's and y's. The FRM further supports the addition of FMEA data such as functional limits, failure modes, and failure severities. This additional data then supports the computation of risk indices for y's and criticality scores for x's. With the ability to use manufacturing data as a source of x values, the FRM can compute the as-manufactured probability of failure, and determine the as-manufactured probability of triggering failure modes.

Figure 16:
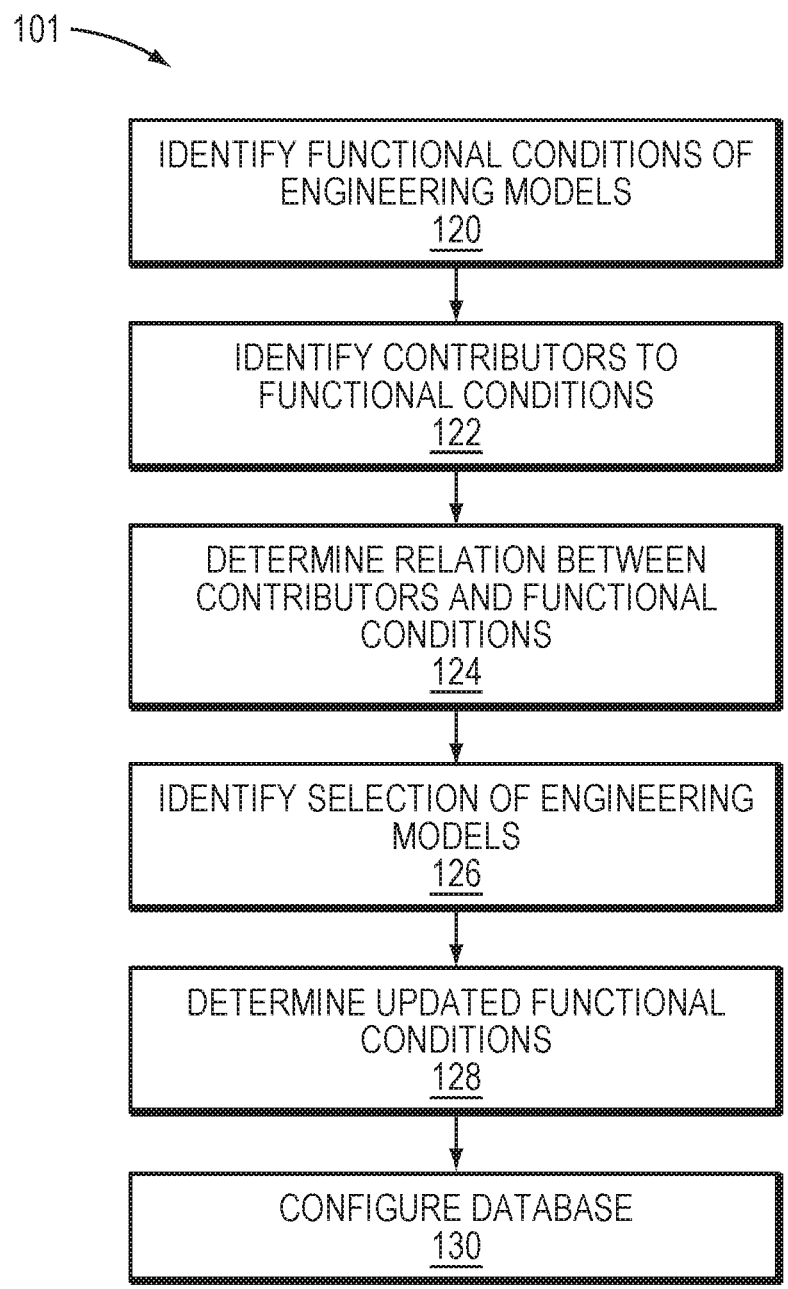
FIG. 16 is a flow diagram illustrating a process of functional relationship management in one embodiment.

FIG. 16 is a flow diagram of a process 101 of functional relation management that may be carried out by a FRM system as described above with reference to FIGS. 1-14. With reference to FIGS. 2-5, the system 200 may identify functional conditions of a plurality of engineering models 202, which define interaction of parts of one or more model assemblies 301-303 to simulate the functional conditions (120). The system 200 may then identify contributors to the functional conditions, where the contributors include geometric properties of the model assemblies 301-303 (122). The system 200 may determine a relation (e.g., a dependency, formula or set of equations) between the contributors and the functional conditions (124), and identify a selection of the engineering models 202 to compute each of the functional conditions as a function of the contributors (126). In response to a change in the contributors, such as a design change or an as-manufactured part having dimensions that differ from the design, the system 200 may determine updated functional conditions (128).

Using the information determined above, the system 200 may configure a database to provide some or all of this information as a structured, relational data set that enables analysis and risk assessment as described above with reference to FIGS. 2-14. For example, the system 200 may configure the database to indicate 1) a subset of the contributors associated with each of the functional conditions, 2) a subset of the functional conditions associated with each of the contributors, and 3) the selection of the engineering models 202 and contributors required to compute each of the functional conditions.

Figure 17:
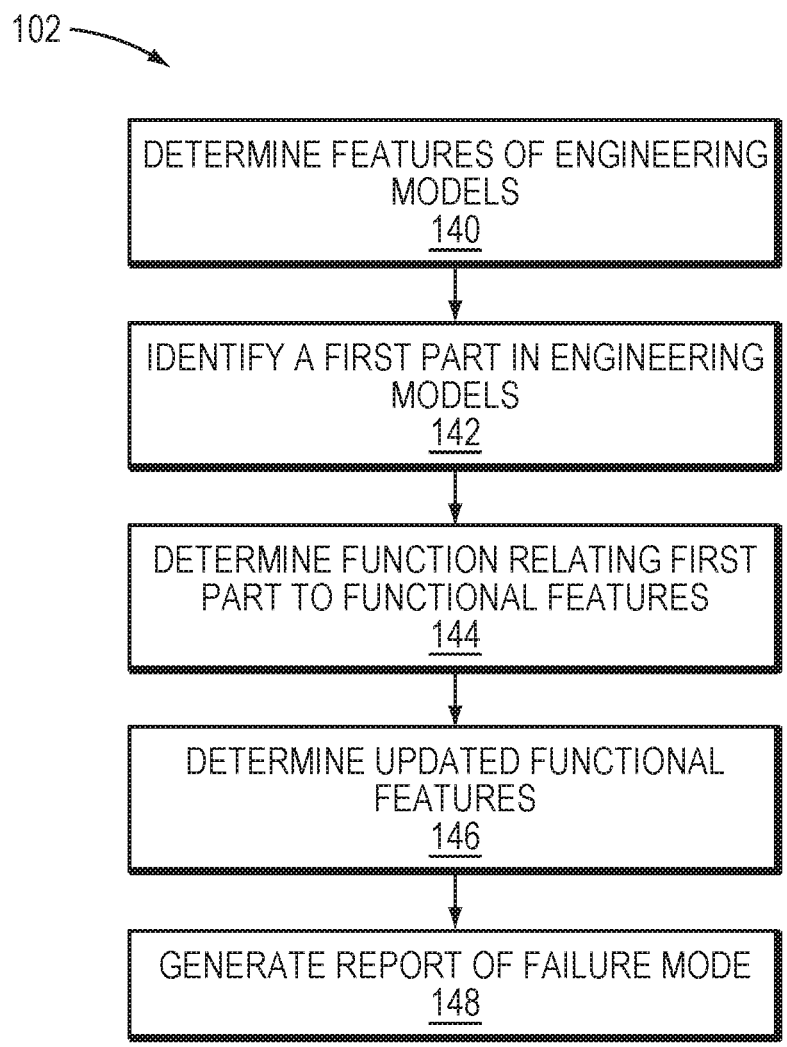
FIG. 17 is a flow diagram illustrating a process of functional relationship management in a further embodiment.

FIG. 17 is a flow diagram of a process 102 of functional relation management that may be carried out by a FRM system as described above with reference to FIGS. 1-14. The process 102 may also be implemented in conjunction with the process 101 of FIG. 15. With reference to FIGS. 2-5, the system 200 may determine features (e.g., geometric features and/or functional features) of a plurality of engineering models 202, which define a plurality of parts positioned in relation to one another in at least one assembly (140). The features may include functional features that indicate properties relating at least two of the plurality of parts. The system 200 may identify a first part present in each of the engineering models 202 (e.g., the spring present in each of the assembly models 301-303 in FIGS. 3-5) (142). The system 200 may then determine a function relating geometric features of the first part to the functional features of the plurality of engineering models 202 (142). The system 200 may determining geometric features of a second part, the geometric features of the second part including at least one dimension that is distinct from the geometric features of the first part (144). For example, the second part may be a substitute for the first part, and may have dimensions of a revised part design, or dimensions of an as-manufactured part that differs from the original design defined by the first part. The system 200 may then determine, based on the function, updated functional features of the engineering models 202 as a result of substituting the second part for the first part in the engineering models 202 (146). Using this information, the system 200 may perform perform an FMEA analysis, as described above, and generate a report identifying at least one failure mode exhibited by the updated functional features.

Figure 18:
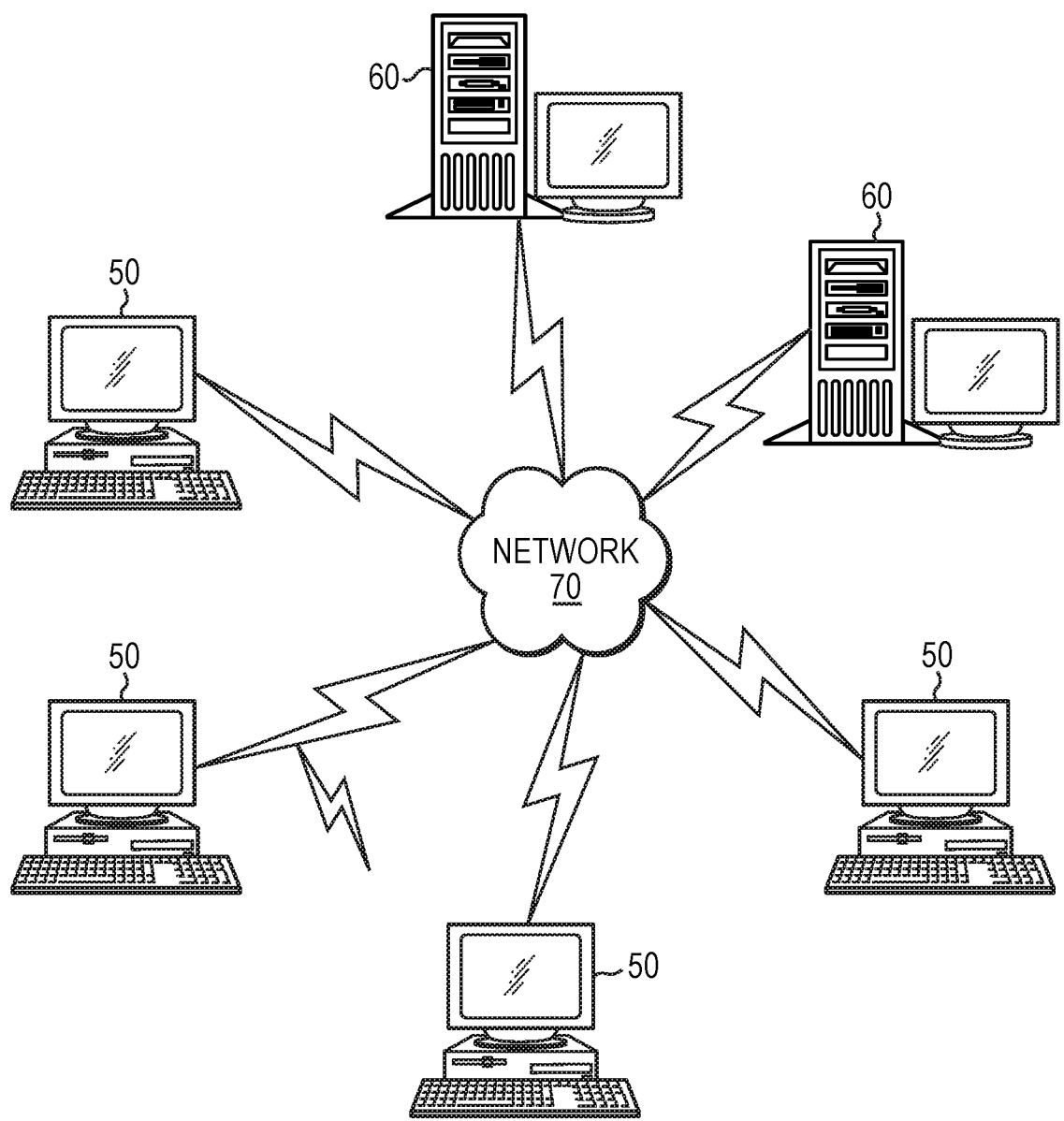
FIG. 18 is a schematic view of a computer network in which embodiments of the present invention may be implemented.

FIG. 18 illustrates a computer network or similar digital processing environment in which embodiments of the present invention may be implemented.

Client computer(s)/devices 50 and server computer(s) 60 provide processing, storage, and input/output devices executing application programs and the like. The client computer(s)/devices 50 can also be linked through communications network 70 to other computing devices, including other client computer(s)/devices 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 19:
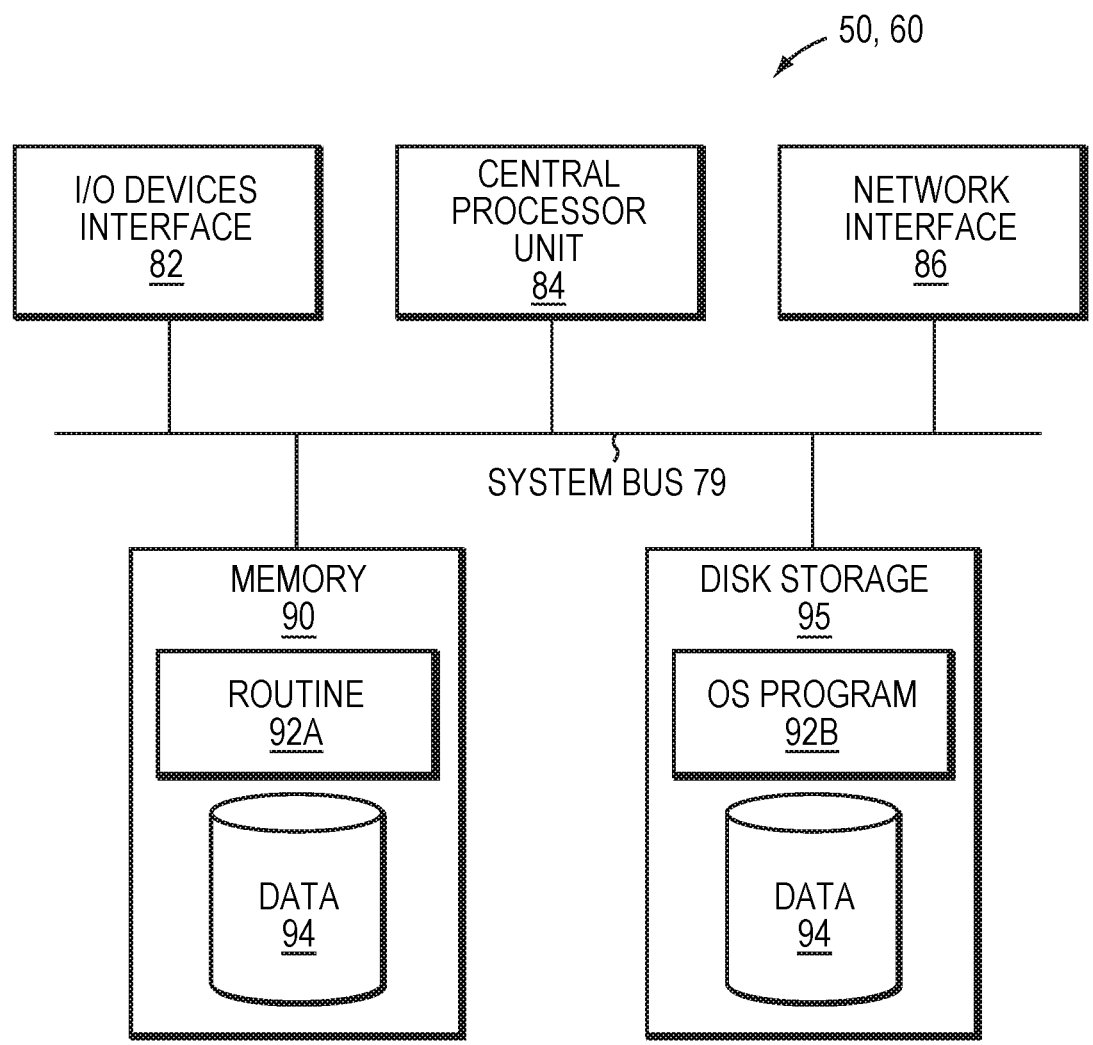
FIG. 19 is a block diagram of a computer system in which embodiments of the present invention may be implemented.

FIG. 19 is a diagram of an example internal structure of a computer (e.g., client processor/device 50 or server computers 60) in the computer system of FIG. 5. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 5). Memory 90 provides volatile storage for computer software instructions 92 and data 94 used to implement an embodiment of the present invention (e.g., structure generation module, computation module, and combination module code detailed above). Disk storage 95 provides non-volatile storage for computer software instructions 92 and data 94 used to implement an embodiment of the present invention. A central processor unit 84 is also attached to the system bus 79 and provides for the execution of computer instructions.

In one embodiment, the processor routines 92 and data 94 may include a computer program product (generally referenced 92), including a non-transitory computer-readable medium (e.g., a removable storage medium) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection.

The diagrams of FIGS. 1-19 are examples that can include more or fewer components, be partitioned into subunits, or be implemented in different combinations. Moreover, the flow diagrams and components of the block diagrams may be implemented in hardware, firmware, or software. If implemented in software, the software may be written in any software language suitable for use in computer systems and networks as illustrated in FIGS. 18 and 19. The software may be embodied on any form of computer readable medium, such as RAM, ROM, or magnetic or optical disk, and loaded and executed by generic or custom processor(s).

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method comprising:
   identifying functional conditions of a plurality of engineering models, the plurality of engineering models defining interaction of parts of at least one model assembly to simulate the functional conditions;
   identifying contributors to the functional conditions, the contributors including geometric properties of the at least one model assembly;
   identifying a relation between the contributors and the functional conditions;
   identifying a selection of the engineering models to compute each of the functional conditions as a function of the contributors;
   determining updated functional conditions in response to a change to the contributors, the determining including 1) identifying the functional conditions affected by changed contributors based on the relation between the contributors and the functional conditions, and 2) creating a list of a subset of the engineering models to be opened to compute the updates based on identified engineering models that compute the functional conditions; and
   configuring a database to indicate 1) a subset of the contributors associated with each of the functional conditions, 2) a subset of the functional conditions associated with each of the contributors, and 3) the selection of the engineering models and contributors required to compute each of the functional conditions.

2. The method of claim 1, wherein the plurality of engineering models define operation of a physics engine for simulating behavior of the plurality of model assemblies.

3. The method of claim 1, wherein the functional conditions represent a result of simulated interaction of parts of an assembly as a function of the plurality of engineering models.

4. The method of claim 1, wherein the functional conditions include geometric conditions, including at least one of a gap between parts, a cumulative dimension, an area, and a volume within the assembly.

5. The method of claim 4, wherein the geometric conditions indicate at least one of 1) whether parts are capable to be assembled as defined in an assembly, 2) whether parts are capable to operate within a required range of motion, and 3) whether a boundary condition of a part is violated.

6. The method of claim 1, wherein the functional conditions include interactive physical conditions, including at least one of a mechanical force, a frictional force, a gravitational force, a velocity, an acceleration, an electrical current, a stress, and a thermal condition.

7. The method of claim 1, wherein the relation includes a user-entered definition governing the interaction of parts of the at least one model assembly.

8. The method of claim 1, wherein the contributors further include non-geometric properties of the at least one model assembly, including at least one of mass and material composition.

9. The method of claim 1, wherein the plurality of engineering models include kinematic tolerance models.

10. The method of claim 1, wherein determining the relation between the contributors and the functional conditions includes variationally solving a system of interdependent equations including values corresponding to 1) the geometric features of the plurality of model assemblies, 2) the functional features of the plurality of model assemblies, and 3) the geometric features of the at least one model assembly.

11. The method of claim 1, further comprising receiving at least one of the plurality of engineering models and a user-entered definition via a network, the database being operated by a server connected to the network.

12. The method of claim 1, further comprising identifying a subset of computer applications that are required to access the engineering models.

13. The method of claim 1, wherein the contributors include values corresponding to at least one of 1) dimensions of an initial assembly design, and 2) dimensions of an as-manufactured part.

14. The method of claim 1, wherein the change to the contributors indicates a substitution of dimensions of an as-manufactured part for dimensions of an initial assembly design.

15. The method of claim 1, further comprising updating the database to correlate the contributors to the parts of the at least one model assembly.

16. The method of claim 1, further comprising associating failure mode indications to the functional conditions.

17. The method of claim 16, further comprising generating a report identifying at least one failure mode exhibited by the updated functional conditions.

18. The method of claim 16, further comprising determining a criticality score for at least one contributor, the criticality score indicating at least one of 1) a severity of a failure mode associated with the contributor, 2) a quantity of functional conditions affected by the contributor, and 3) a degree of sensitivity of at least one functional condition affected by the contributor.

19. The method of claim 16, further comprising determining a risk analysis for at least one functional condition, the risk analysis indicating a probability of a failure mode associated with the functional condition.

20. The method of claim 16, further comprising determining a risk analysis for a part of the at least one model assembly, the risk analysis indicating a probability of a failure mode associated with the part.

21. The method of claim 16, further comprising determining a risk analysis for a selected set of contributors, the risk analysis indicating a probability of a failure mode associated with the selected set of contributors.

22. The method of claim 1, further including identifying the contributors from at least one of a computer-aided design (CAD) model, a statistical process control (SPC) system, and a metrology system.

23. The method of claim 1, further comprising configuring the database to indicate the updated functional conditions.

24. The method of claim 1, wherein the plurality of engineering models include at least one table indicating at least a subset of the contributors and functional conditions.

25. The method of claim 1, wherein determining the relation between the contributors and the functional conditions includes parametrically solving a system of equations including values corresponding to 1) the geometric features of the plurality of model assemblies, 2) the functional features of the plurality of model assemblies, and 3) the geometric features of the at least one model assembly.

26. A computer-implemented method comprising:
  identifying functional conditions of a plurality of engineering models, the plurality of engineering models defining interaction of parts of at least one model assembly to simulate the functional conditions;
  identifying contributors to the functional conditions, the contributors including geometric properties of the at least one model assembly;
  identifying a relation between the contributors and the functional conditions;
  identifying a selection of the engineering models to compute each of the functional conditions as a function of the contributors;
  determining updated functional conditions in response to a change to the contributors; and
  configuring a database to indicate 1) a subset of the contributors associated with each of the functional conditions, 2) a subset of the functional conditions associated with each of the contributors, and 3) the selection of the engineering models and contributors required to compute each of the functional conditions;
  wherein determining the updating the functional conditions includes:
  1) identifying the functional conditions affected by changed contributors based on the relation between the contributors and the functional conditions;
  2) creating a list of a subset of the engineering models to be opened to compute the updates based on identified engineering models that compute the functional conditions;
  3) accessing the subset of the engineering models via identified applications;
  4) sending the changed contributor values to the subset of the engineering models;
  5) using the subset of the engineering models to compute new functional condition values; and
  6) retrieving updated functional condition values from the models.

* * * * *